United States Patent
Ishibashi et al.

(10) Patent No.: US 12,469,677 B2
(45) Date of Patent: Nov. 11, 2025

(54) ION IMPLANTATION METHOD, ION IMPLANTER, AND METHOD FOR MANUFACTURING SEMICONDUCTOR DEVICE

(71) Applicant: SUMITOMO HEAVY INDUSTRIES ION TECHNOLOGY CO., LTD., Tokyo (JP)

(72) Inventors: Kazuhisa Ishibashi, Ehime (JP); Toshio Yumiyama, Ehime (JP)

(73) Assignee: SUMITOMO HEAVY INDUSTRIES ION TECHNOLOGY CO., LTD., Tokyo (JP)

( * ) Notice: Subject to any disclaimer, the term of this patent is extended or adjusted under 35 U.S.C. 154(b) by 480 days.

(21) Appl. No.: 17/974,188

(22) Filed: Oct. 26, 2022

(65) Prior Publication Data
US 2023/0140499 A1   May 4, 2023

(30) Foreign Application Priority Data
Oct. 28, 2021   (JP) ................. 2021-176875

(51) Int. Cl.
H01J 37/317   (2006.01)
H01J 37/304   (2006.01)

(52) U.S. Cl.
CPC ........ *H01J 37/3171* (2013.01); *H01J 37/304* (2013.01); *H01J 2237/24535* (2013.01)

(58) Field of Classification Search
CPC ............... H01J 37/3171; H01J 37/304; H01J 2237/24535; H01J 2237/30455; H01J 2237/30483; H01J 2237/31703; H01J 37/3045; H01L 21/265
See application file for complete search history.

(56) References Cited

U.S. PATENT DOCUMENTS

| | | | |
|---|---|---|---|
| 7,550,751 B2 | 6/2009 | Benveniste et al. | |
| 8,692,216 B2 | 4/2014 | Kariya et al. | |
| 10,217,607 B2 | 2/2019 | Ishibashi et al. | |

FOREIGN PATENT DOCUMENTS

| | | |
|---|---|---|
| JP | H07-169432 A | 7/1995 |
| JP | 2009-533820 A | 9/2009 |
| JP | 2011-047798 A | 3/2011 |
| JP | 5074480 B2 | 11/2012 |
| JP | 2013-206833 A | 10/2013 |
| JP | 2018-041595 A | 3/2018 |

*Primary Examiner* — Wyatt A Stoffa
*Assistant Examiner* — Christopher J Gassen
(74) *Attorney, Agent, or Firm* — Michael Best & Friedrich LLP

(57) ABSTRACT

An ion implantation method includes generating a first scan beam, based on a first scan signal, measuring a beam current of the first scan beam by using a beam measurement device at a plurality of measurement positions, calculating a beam current matrix, based on a time waveform of the beam current measured by the beam measurement device and a time waveform of the scan command values determined in the first scan signal, calculating a first beam current density distribution of the first scan beam in a predetermined direction by performing time integration on the measured beam current, correcting a value of each component of the beam current matrix, based on the first beam current density distribution, and generating a second scan signal for realizing a target beam current density distribution in the predetermined direction, based on the corrected beam current matrix.

24 Claims, 14 Drawing Sheets

| REGION NO. | X-RANGE (mm) | | Y-RANGE (mm) | | CORRECTION FUNCTION | CORRECTION COEFFICIENT |
|---|---|---|---|---|---|---|
| | LEFT POSITION | RIGHT POSITION | LOWER POSITION | UPPER POSITION | | |
| 1 | −20 | +20 | +145 | +155 | A | 0.51 |
| 2 | −50 | +50 | +135 | +145 | B | 0.67 |
| 3 | −75 | +75 | +125 | +135 | B | 0.84 |
| 4 | −90 | +90 | +115 | +125 | C | 1.03 |
| 5 | −100 | +100 | +105 | +115 | D | 1.29 |
| ⋮ | ⋮ | ⋮ | ⋮ | ⋮ | ⋮ | ⋮ |
| 16 | −150 | +150 | −5 | +5 | C | 2.15 |
| ⋮ | ⋮ | ⋮ | ⋮ | ⋮ | ⋮ | ⋮ |
| 31 | −20 | +20 | −155 | −145 | A | 0.42 |

…

ION IMPLANTATION METHOD, ION IMPLANTER, AND METHOD FOR MANUFACTURING SEMICONDUCTOR DEVICE

RELATED APPLICATIONS

The content of Japanese Patent Application No. 2021-176875, on the basis of which priority benefits are claimed in an accompanying application data sheet, is in its entirety incorporated herein by reference.

BACKGROUND

Technical Field

Certain embodiments of the present disclosure relate to an ion implantation method, an ion implanter, and a method for manufacturing a semiconductor device.

Description of Related Art

In a manufacturing process of a semiconductor device, a process of implanting ions into a semiconductor wafer (also referred to as an ion implantation process) is generally performed in order to change conductivity of a semiconductor, or in order to change a crystal structure of the semiconductor. An apparatus used for the ion implantation process is called an ion implanter. In the ion implantation process, in addition to "uniform implantation" performed so that a two-dimensional dose distribution is uniform on a wafer processing surface, "nonuniform implantation" performed so that the two-dimensional dose distribution is intentionally nonuniform may be required.

The two-dimensional dose distribution on the wafer processing surface is controlled by changing at least one of a beam scan speed and a wafer scan speed in accordance with a beam irradiation position on the wafer processing surface. For example, a beam scan speed distribution in a beam scan direction is adjusted to control a one-dimensional dose distribution in the beam scan direction. The beam scan speed distribution for realizing a target one-dimensional dose distribution is calculated, based on a measurement value and a target value of a beam current density distribution in the beam scan direction. In calculating the beam scan speed distribution, a relationship that beam current density is inversely proportional to the beam scan speed is used.

SUMMARY

According to an embodiment of the present disclosure, there is provided an ion implantation method including generating a first scan beam by performing a reciprocating scan using a spot-like ion beam in a predetermined direction, based on a first scan signal, measuring a beam current of the first scan beam by using a beam measurement device at a plurality of measurement positions different in the predetermined direction, calculating a beam current matrix in which beam current values with respect to a plurality of positions different in the predetermined direction and a plurality of scan command values are set as components, based on a time waveform of the beam current measured by the beam measurement device and a time waveform of the scan command values determined in the first scan signal, calculating a first beam current density distribution of the first scan beam in the predetermined direction by performing time integration on the measured beam current, correcting a value of each component of the beam current matrix, based on the first beam current density distribution, and generating a second scan signal for realizing a target beam current density distribution in the predetermined direction, based on the corrected beam current matrix.

According to another embodiment of the present disclosure, there is provided an ion implanter. The ion implanter includes a beam scan unit that generates a first scan beam by performing a reciprocating scan using a spot-like ion beam in a predetermined direction, based on a first scan signal, a beam measurement device configured to measure a beam current of the first scan beam at a plurality of measurement positions different in the predetermined direction, and a control device that generates a scan signal for determining a time waveform of a plurality of scan command values with respect to scan positions in the predetermined direction, based on a measurement obtained by the beam measurement device. the control device is configured to acquire a time waveform of the beam current of the first scan beam measured at the plurality of measurement positions, calculate a beam current matrix in which beam current values with respect to a plurality of positions different in the predetermined direction and the plurality of scan command values are set as components, based on the acquired time waveform of the beam current and the time waveform of the scan command values determined in the first scan signal, calculate a first beam current density distribution of the first scan beam in the predetermined direction by performing time integration on the measured beam current, correct a value of each component of the beam current matrix, based on the first beam current density distribution, and generate a second scan signal for realizing a target beam current density distribution in the predetermined direction, based on the corrected beam current matrix.

According to still another embodiment of the present disclosure, there is provided a method for manufacturing a semiconductor device. The method for manufacturing a semiconductor device includes an ion implantation process. The ion implantation process includes generating a first scan beam by performing a reciprocating scan using a spot-like ion beam in a predetermined direction, based on a first scan signal, measuring a beam current of the first scan beam at a plurality of measurement positions different in the predetermined direction, calculating a beam current matrix in which beam current values with respect to a plurality of positions different in the predetermined direction and a plurality of scan command values are set as components, based on a time waveform of the measured beam current and a time waveform of the scan command values determined in the first scan signal, calculating a first beam current density distribution of the first scan beam in the predetermined direction by performing time integration on the measured beam current, correcting a value of each component of the beam current matrix, based on the first beam current density distribution, generating a second scan signal for realizing a target beam current density distribution, based on the corrected beam current matrix, generating a second scan beam by performing the reciprocating scan using the spot-like ion beam in the predetermined direction, based on the second scan signal, and irradiating a semiconductor wafer with the second scan beam.

DETAILED DESCRIPTION

Figure 1:
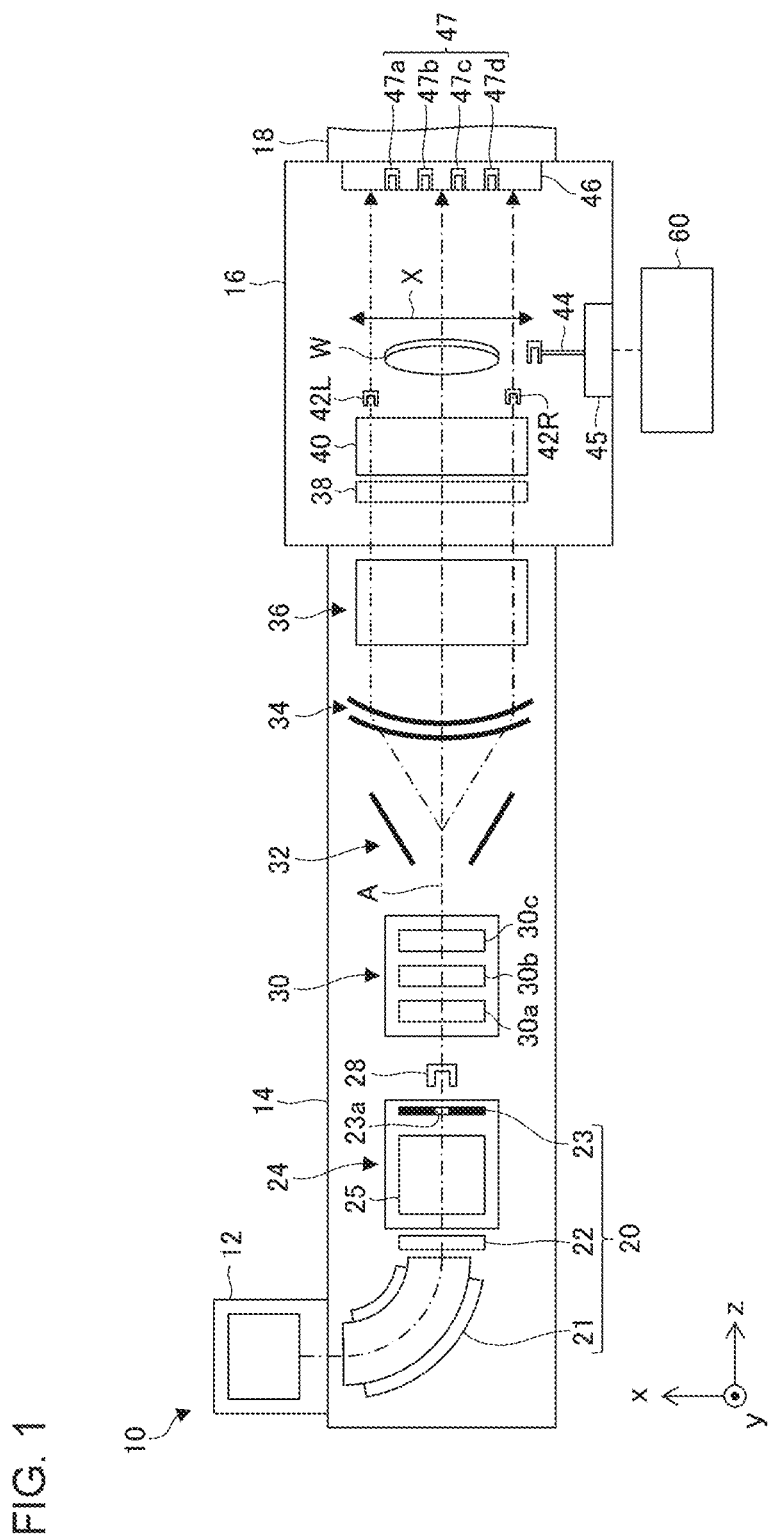
FIG. 1 is a top view illustrating a schematic configuration of an ion implanter according to an embodiment.

When a beam size is sufficiently small and a beam current is constant regardless of a position, a simple inversely proportional relationship is established between the beam current density distribution and the beam scan speed distribution. Therefore, the beam scan speed distribution for realizing the target value can be easily calculated. However, as the beam size increases, the simple inversely proportional relationship is less likely to be established. Accordingly, the measurement value of the beam current density distribution obtained by the calculated beam scan speed distribution may significantly deviate from the target value. In this case, it is necessary to repeat measurement and calculation until the beam scan speed distribution for realizing the target value is obtained. Therefore, it takes time for adjustment. In some cases, adjustment of the beam scan speed distribution may fail. An increase for adjustment time or an adjustment failure leads to degraded productivity in the ion implantation process.

It is desirable to provide a technique for improving productivity in an ion implantation process.

Any desired combination of the above-described components, and those in which components or expressions according to the present disclosure are substituted from each other in methods, devices, or systems are effectively applicable as an aspect of the present disclosure.

According to a non-limiting exemplary embodiment of the present disclosure, a technique for improving productivity in an ion implantation process can be provided.

Hereinafter, embodiments for implementing an ion implantation method, an ion implanter, and a method for manufacturing a semiconductor device according to the present disclosure will be described in detail with reference to the drawings. In describing the drawings, the same reference numerals will be assigned to the same elements, and repeated description will be appropriately omitted. In addition, configurations described below are merely examples, and do not limit the scope of the present disclosure in any way.

Before the embodiments are described in detail, an outline will be described. The present embodiment relates to a technique for controlling a two-dimensional dose distribution of an ion beam used to irradiate a semiconductor wafer, and more particularly relates to a technique for controlling a one-dimensional beam current density distribution in a beam scan direction. The beam current density distribution in the beam scan direction is controlled by adjusting a beam scan speed distribution of a beam scan using a reciprocating ion beam. In the present embodiment, instead of using a simple relationship that an inversely proportional relationship is established between the beam current density distribution and the beam scan speed distribution, a relationship between the beam current density distribution and the beam scan speed distribution will be defined by using a "beam current matrix".

The beam current matrix consists of beam current values I(Vi, Xj)=Iij with respect to scan command values Vi and positions Xj in the x-direction, and represents a set of beam current distributions (that is, beam shapes) in an x-direction of the spot-like ion beam forming a scan beam. A beam current density distribution J (Xj) with respect to the positions Xj in the x-direction is expressed by Equation (1) below.

$$J(X_j) = \sum_i I_{ij} \cdot \Delta t_i \qquad (1)$$

Here, $\Delta t_i$ is a minute time held at the scan command value Vi in the beam scan (that is, a staying time of the scan beam), and is proportional to a reciprocal of a beam scan speed at the scan command value Vi.

In the present embodiment, the beam staying time $\Delta t_i$ for realizing a target beam current density distribution J (Xj) is calculated by using the beam current matrix Iij, and a scan signal is generated, based on the beam staying time $\Delta t_i$ held at the scan command value Vi in the beam scan. The beam current matrix includes all information relating to the beam shape of the spot-like ion beam in the x-direction. Accordingly, even when a beam size (that is, a spot size) of the ion beam in the x-direction is large, the scan signal for realizing the target beam current density distribution J (Xj) can be highly accurately calculated in a short time.

In the present embodiment, furthermore, a value of each component Iij of the beam current matrix is corrected, based on a measurement value of the beam current density distribution, and the scan signal for realizing the target beam current density distribution is generated, based on the corrected beam current matrix. By using the corrected beam current matrix, the beam current matrix can conform to the actual measurement value of the beam current density distribution. Since the scan signal is generated, based on the corrected beam current matrix, the scan signal for realizing the target beam current density distribution can be highly accurately calculated in a short time.

Figure 2:
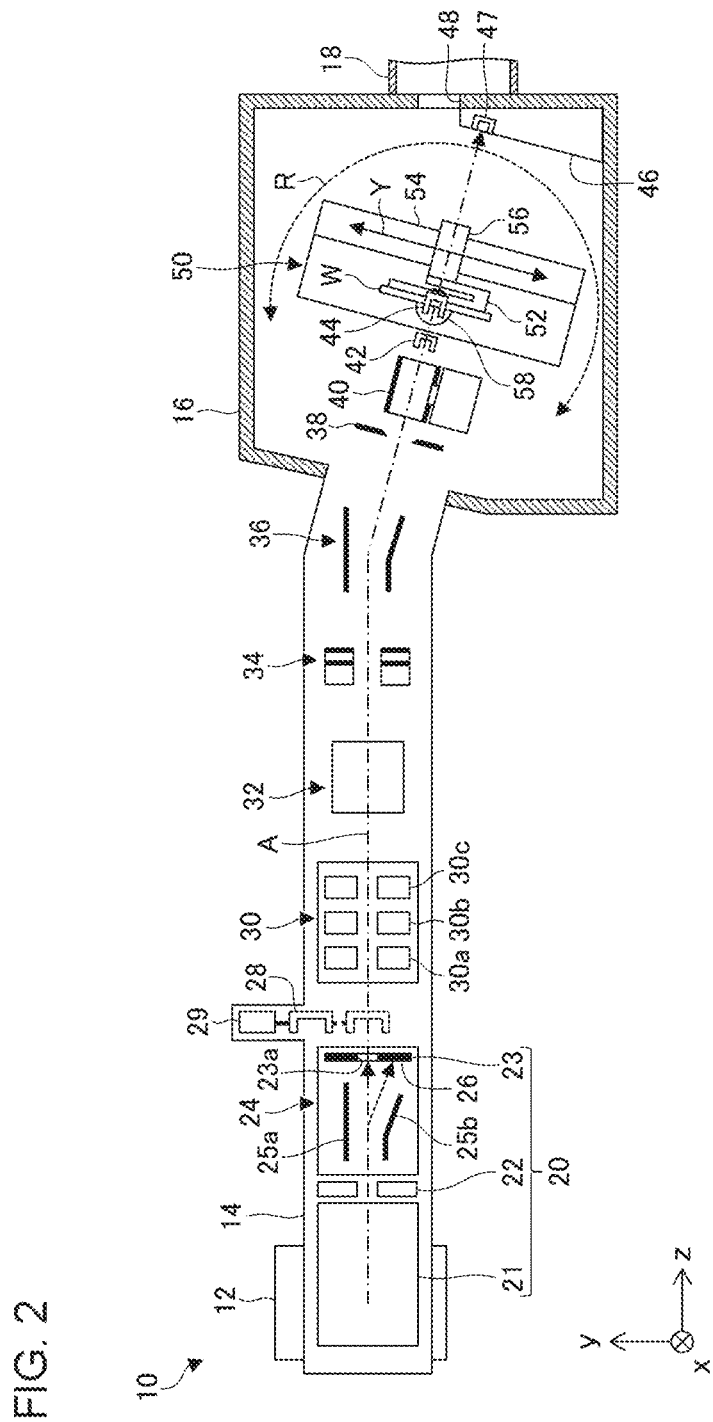
FIG. 2 is a side view illustrating a schematic configuration of the ion implanter in FIG. 1.

FIG. 1 is a top view schematically illustrating an ion implanter 10 according to an embodiment, and FIG. 2 is a side view illustrating a schematic configuration of the ion implanter 10. The ion implanter 10 is configured to perform an ion implantation process on a surface of a workpiece. For example, the workpiece is a substrate, or for example, the workpiece is a semiconductor wafer. For convenience of description, the workpiece may be referred to as a wafer W in the specification herein. However, this is not intended to limit an implantation process target to a specific object.

The ion implanter 10 is configured to irradiate a whole processing surface of the wafer W with the spot-like ion beam by performing a reciprocating scan using the beam in one direction and causing the wafer W to reciprocate in a direction perpendicular to a scan direction. In the specification herein, for convenience of description, a traveling direction of the ion beam traveling along a designed beamline A is defined as a z-direction, and a plane perpendicular to the z-direction is defined as an xy-plane. When the wafer W is scanned with the ion beam, the scan direction of the beam is defined as an x-direction, and a direction perpendicular to the z-direction and the x-direction is defined as a y-direction. Therefore, the reciprocating scan using the beam is performed in the x-direction, and a reciprocating movement of the wafer W is performed in the y-direction.

The ion implanter 10 includes an ion generation device 12, a beamline unit 14, an implantation processing chamber 16, and a wafer transport device 18. The ion generation device 12 is configured to provide the ion beam for the beamline unit 14. The beamline unit 14 is configured to transport the ion beam from the ion generation device 12 to the implantation processing chamber 16. The implantation processing chamber 16 accommodates the wafer W serving as an implantation target, and an implantation process of irradiating the wafer W with the ion beam provided from the beamline unit 14 is performed in the implantation processing chamber 16. The wafer transfer device 18 is configured to load an unprocessed wafer before the implantation process into the implantation processing chamber 16, and unload a processed wafer after the implantation process from the implantation processing chamber 16. The ion implanter 10 includes a vacuum system (not illustrated) for providing a desired vacuum environment for the ion generation device 12, the beamline unit 14, the implantation processing chamber 16, and the wafer transfer device 18.

The beamline unit 14 includes a mass analyzing unit 20, a beam park device 24, a beam shaping unit 30, a beam scan unit 32, a beam parallelizing unit 34, and an angular energy filter (AEF) 36, in order from an upstream side of the beamline A. The upstream region of the beamline A means a region closer to the ion generation device 12, and a downstream side of the beamline A means a side closer to the implantation processing chamber 16 (or a beam stopper 46).

The mass analyzing unit 20 is provided downstream of the ion generation device 12, and is configured to select a required ion species from the ion beam extracted from the ion generation device 12 by performing mass analyzing. The mass analyzing unit 20 has a mass analyzing magnet 21, a mass analyzing lens 22, and a mass resolving aperture 23.

The mass analyzing magnet 21 applies a magnetic field to the ion beam extracted from the ion generation device 12, and deflects the ion beam to travel in a specific path in accordance with a value of the mass-to-charge ratio $M=m/q$ (m is mass, and q is charge) of the ions. For example, the mass analyzing magnet 21 applies the magnetic field in the y-direction (−y-direction in FIGS. 1 and 2) to the ion beam so that the ion beam is deflected in the x-direction. Magnetic field intensity of the mass analyzing magnet 21 is adjusted so that the ion species having a desired mass-to-charge ratio M passes through the mass resolving aperture 23.

The mass analyzing lens 22 is provided downstream of the mass analyzing magnet 21, and is configured to adjust focusing/defocusing power for the ion beam. The mass analyzing lens 22 adjusts a focusing position of the ion beam passing through the mass resolving aperture 23 in a beam traveling direction (z-direction), and adjusts a mass resolution M/dM of the mass analyzing unit 20. The mass analyzing lens 22 is not an essential component, and the mass analyzing unit 20 may not have the mass analyzing lens 22.

The mass resolving aperture 23 is provided downstream of the mass analyzing lens 22, and is provided at a position away from the mass analyzing lens 22. The mass resolving aperture 23 is configured so that a beam deflection direction (x-direction) by the mass analyzing magnet 21 is a slit width direction, and has an opening 23a having a shape which is relatively short in the x-direction and relatively long in the y-direction.

The mass resolving aperture 23 may be configured so that the slit width is variable for adjusting the mass resolution. The mass resolving aperture 23 may be configured to include two beam shield members that are movable in the slit width direction, and may be configured so that the slit width is adjustable by changing an interval between the two beam shield members. The mass resolving aperture 23 may be configured so that the slit width is variable by selecting any one of a plurality of slits having different slit widths.

The beam park device 24 is configured to cause the ion beam to temporarily retreat from the beamline A and to temporarily block the ion beam directed to the implantation processing chamber 16 (or the wafer W) located downstream. The beam park device 24 can be disposed at any desired position in an intermediate portion of the beamline A. For example, the beam park device 24 can be disposed between the mass analyzing lens 22 and the mass resolving aperture 23. A prescribed distance is required between the mass analyzing lens 22 and the mass resolving aperture 23. Accordingly, the beam park device 24 is disposed between both of them. In this manner, a length of the beamline A can be shortened, compared to a case where the beam park device 24 is disposed at another position. Therefore, the whole ion implanter 10 can be reduced in size.

The beam park device 24 includes a pair of park electrodes 25 (25a and 25b) and a beam dump 26. The pair of park electrodes 25a and 25b face each other across the beamline A, and faces in a direction (y-direction) perpendicular to the beam deflection direction (x-direction) of the mass analyzing magnet 21. The beam dump 26 is provided on the downstream side of the beamline A than the park electrodes 25a and 25b, and is provided away from the beamline A in a facing direction of the park electrodes 25a and 25b.

The first park electrode 25a is disposed on an upper side of the beamline A in a direction of gravity, and the second park electrode 25b is disposed on a lower side of the beamline A in the direction of gravity. The beam dump 26 is provided at a position away to the lower side of the beamline A in the direction of gravity, and is disposed on the lower side of the opening 23a of the mass resolving aperture 23 in the direction of gravity. For example, the beam dump 26 is configured to include a portion of the mass analyzing slit 23 where the opening 23a is not formed. The beam dump 26 may be configured to be separate from the mass resolving aperture 23.

The beam park device 24 deflects the ion beam by using an electric field applied between the pair of park electrodes 25a and 25b, and causes the ion beam to retreat from the beamline A. For example, a negative voltage is applied to the second park electrode 25b, based on a potential of the first park electrode 25a. In this manner, the ion beam is deflected downward from the beamline A in the direction of gravity, and is incident into the beam dump 26. In FIG. 2, a trajectory of the ion beam directed toward the beam dump 26 is indicated by a broken line. The beam park device 24 causes the ion beam to pass toward the downstream side along the beamline A by setting the pair of park electrodes 25a and 25b to have the same potential. The beam park device 24 is configured to be operable by switching between a first mode in which the ion beam passes to the downstream side and a second mode in which the ion beam is incident into the beam dump 26.

An injector Faraday cup 28 is provided downstream of the mass resolving aperture 23. The injector Faraday cup 28 is configured to be movable into and out of the beamline A by an operation of an injector drive unit 29. The injector drive unit 29 moves the injector Faraday cup 28 in a direction (for example, the y-direction) perpendicular to an extending direction of the beamline A. When the injector Faraday cup 28 is disposed on the beamline A as illustrated by a broken line in FIG. 2, the injector Faraday cup 28 blocks the ion beam directed toward the downstream side. On the other hand, as illustrated by a solid line in FIG. 2, when the injector Faraday cup 28 retreats from the beamline A, the blocking of the ion beam directed toward the downstream side is released.

The injector Faraday cup 28 is configured to measure a beam current of the ion beam subjected to mass analyzing by the mass analyzing unit 20. The injector Faraday cup 28 can measure a mass analyzing spectrum of the ion beam by measuring the beam current while changing the magnetic field intensity of the mass analyzing magnet 21. The mass resolution of the mass analyzing unit 20 can be calculated using the measured mass analyzing spectrum.

The beam shaping unit 30 includes a focusing/defocusing device such as a focusing/defocusing quadrupole lens (Q-lens), and is configured to shape the ion beam having passed through the mass analyzing unit 20 to have a desired cross-sectional shape. For example, the beam shaping unit 30 is configured to include an electric field type three-stage quadrupole lens (also referred to as a triplet Q-lens), which has three quadrupole lenses 30a, 30b, and 30c. The beam shaping unit 30 adopts the three lens devices 30a to 30c. Accordingly, the beam shaping unit 30 can adjust the ion beam to converge or diverge independently in the x-direction and the y-direction, respectively. The beam shaping unit 30 may include a magnetic field type lens device, or may include a lens device that shapes the beam by using both an electric field and a magnetic field.

The beam scan unit 32 is configured to provide reciprocating scan using the beam and is a beam deflection device to perform scanning using the shaped ion beam in the x-direction. The beam scan unit 32 has a scan electrode pair facing in a beam scan direction (x-direction). The scan electrode pair is connected to a variable voltage power supply (not illustrated), and a voltage applied between scanning electrode pair is periodically changed. In this manner, an electric field generated between the electrodes is changed so that the ion beam is deflected at various angles. As a result, a whole scan range is scanned with the ion beam in the x-direction. In FIG. 1, the scan direction and the scan range of the beam are indicated by an arrow X, and a plurality of trajectories of the ion beam in the scan range are indicated by a one dot chain line. The beam scan unit 32 may be replaced with another beam scan unit, and the beam scan unit may be configured to serve as a magnet device using a magnetic field.

The beam parallelizing unit 34 is configured so that the traveling direction of the ion beam used for the scanning becomes parallel to the trajectory of the designed beamline A. The beam parallelizing unit 34 has a plurality of arc-shaped parallelizing lens electrodes in which an ion beam passing slit is provided in a central portion in the y-direction. The parallelizing lens electrode is connected to a high-voltage power supply (not illustrated), and applies an electric field generated by voltage application to the ion beam so that the traveling directions of the ion beam are parallelized. The beam parallelizing unit 34 may be replaced with another beam parallelizing device, and the beam parallelizing device may be configured to serve as a magnet device using a magnetic field.

An acceleration/deceleration (AD) column (not illustrated) for accelerating or decelerating the ion beam may be provided downstream of the beam parallelizing unit 34.

The angular energy filter (AEF) 36 is configured to analyze energy of the ion beam, to deflect ions having necessary energy downward, and to guide the ions to the implantation processing chamber 16. The angular energy filter 36 has an AEF electrode pair for electric field deflection. The AEF electrode pair is connected to a high-voltage power supply (not illustrated). In FIG. 2, the ion beam is deflected downward by applying a positive voltage to the upper AEF electrode and applying a negative voltage to the lower AEF electrode. The angular energy filter 36 may be configured to include a magnet device for magnetic field deflection, or may be configured to include a combination between the AEF electrode pair for electric field deflection and the magnet device for magnetic field deflection.

In this way, the beamline unit 14 supplies the ion beam to be used for irradiating the wafer W to the implantation processing chamber 16. In the present embodiment, the ion generation device 12 and the beamline unit 14 are also referred to as a beam generation device. The beam generation device is configured to generate the ion beam for realizing a desired implantation condition by adjusting operation parameters of various devices constituting the beam generation device.

The implantation processing chamber 16 includes an energy slit 38, a plasma shower device 40, side cups 42 (42L and 42R), a profiler cup 44, and the beam stopper 46, in order from the upstream side of the beamline A. As illustrated in FIG. 2, the implantation processing chamber 16 includes a platen driving device 50 that holds one or more wafers W.

The energy slit 38 is provided on the downstream side of the angular energy filter 36, and analyzes the energy of the ion beam incident into the wafer W together with the angular energy filter 36. The energy slit 38 is an energy defining slit (EDS) configured to include a slit that is horizontally long in the beam scan direction (x-direction). The energy slit 38 causes the ion beam having a desired energy value or a desired energy range to pass toward the wafer W, and blocks the other ion beams.

The plasma shower device 40 is located on the downstream side of the energy slit 38. The plasma shower device 40 supplies low-energy electrons to the ion beam and a surface of the wafer W (wafer processing surface) in accordance with a beam current amount of the ion beam, and suppresses charge-up caused by accumulation of positive charges on the wafer processing surface which are induced by the ion implantation. For example, the plasma shower device 40 includes a shower tube through which the ion beam passes, and a plasma generating device that supplies electrons into the shower tube.

The side cups 42 (42L and 42R) are configured to measure the beam current of the ion beam during the ion implantation process into the wafer W. As illustrated in FIG. 2, the side cups 42L and 42R are disposed to be shifted to the left and right (x-direction) with respect to the wafer W disposed on the beamline A, and are disposed at positions where the side cups 42L and 42R do not block the ion beam directed toward the wafer W during the ion implantation. The ion beam is used for scanning in the x-direction beyond a range where the wafer W is located. Accordingly, a portion of the beam used for the scanning is incident into the side cups 42L and 42R even during the ion implantation. In this manner, the beam current amount during the ion implantation process is measured by the side cups 42L and 42R.

The profiler cup 44 is a Faraday cup configured to measure the beam current on the wafer processing surface. The profiler cup 44 is configured to be movable by an operation of a profiler driving device 45, retreats from an implantation position where the wafer W is located during the ion implantation, and is inserted into the implantation position when the wafer W is not located at the implantation position. The profiler cup 44 measures the beam current while moving in the x-direction. In this manner, the profiler cup 44 can measure the beam current over the whole beam scan range in the x-direction. In the profiler cup 44, a plurality of Faraday cups may be aligned in the x-direction to be formed in an array shape so that the beam currents can be simultaneously measured at a plurality of positions in the beam scan direction (x-direction).

At least one of the side cups 42 and the profiler cup 44 may include a single Faraday cup for measuring the beam current amount, or may include an angle measurement device for measuring angle information of the beam. For example, the angle measurement device includes a slit and a plurality of current detectors provided away from the slit in the beam traveling direction (z-direction). For example, the angle measurement device can measure an angle component of the beam in the slit width direction by causing the plurality of current detectors aligned in the slit width direction to measure the beam having passed through the slit. At least one of the side cups 42 and the profiler cup 44 may include a first angle measurement device capable of measuring angle information in the x-direction and a second angle measurement device capable of measuring angle information in the y-direction.

The platen driving device 50 includes a wafer holding device 52, a reciprocating mechanism 54, a twist angle adjusting mechanism 56, and a tilt angle adjusting mechanism 58. The wafer holding device 52 includes an electrostatic chuck for holding the wafer W. The reciprocating mechanism 54 causes the wafer holding device 52 to reciprocate in a reciprocating direction (y-direction) perpendicular to the beam scan direction (x-direction). In this manner, the wafer held by the wafer holding device 52 is caused to reciprocate in the y-direction. In FIG. 2, a reciprocating movement of the wafer W is indicated by an arrow Y as an example.

The twist angle adjusting mechanism 56 adjusts a rotation angle of the wafer W. The twist angle adjusting mechanism 56 rotates the wafer W around a normal line of the wafer processing surface as a rotation center axis. In this manner, the twist angle adjusting mechanism 56 adjusts a twist angle between an alignment mark provided on an outer peripheral portion of the wafer and a reference position. Here, the alignment mark of the wafer means a notch or an orientation flat provided on the outer peripheral portion of the wafer, and means a mark that serves as a reference for a crystal axis direction of the wafer or an angular position in a circumferential direction of the wafer. The twist angle adjusting mechanism 56 is provided between the wafer holding device 52 and the reciprocating mechanism 54, and is caused to reciprocate together with the wafer holding device 52.

The tilt angle adjusting mechanism 58 adjusts tilting of the wafer W, and adjusts a tilt angle between the traveling direction of the ion beam directed toward the wafer processing surface and the normal line of the wafer processing surface. In the present embodiment, out of tilt angles of the wafer W, an angle with respect to which the axis in the x-direction is a rotation center axis is adjusted as the tilt angle. The tilt angle adjusting mechanism 58 is provided between the reciprocating mechanism 54 and an inner wall of the implantation processing chamber 16, and rotates the whole platen driving device 50 including the reciprocating mechanism 54 in an R-direction. In this manner, the tilt angle adjusting mechanism 58 is configured to adjust the tilt angle of the wafer W.

The platen driving device 50 holds the wafer W so that the wafer W is movable between an implantation position where the wafer W is irradiated with the ion beam and a transfer position where the wafer W is loaded or unloaded between the platen driving device 50 and the wafer transfer device 18. FIG. 2 illustrates a state where the wafer W is located at the implantation position, and the platen driving device 50 holds the wafer W so that the beamline A and the wafer W intersect with each other. The transfer position of the wafer W corresponds to a position of the wafer holding device 52 when the wafer W is loaded or unloaded through a transfer port 48 by a transfer mechanism or a transfer robot provided in the wafer transfer device 18.

The beam stopper 46 is provided on the most downstream side of the beamline A, and is mounted on the inner wall of the implantation processing chamber 16, for example. When the wafer W does not exist on the beamline A, the ion beam is incident into the beam stopper 46. The beam stopper 46 is located close to the transfer port 48 that connects the implantation processing chamber 16 and the wafer transfer device 18 to each other, and is provided at a position vertically below the transfer port 48.

The beam stopper 46 has a plurality of tuning cups 47 (47*a*, 47*b*, 47*c*, and 47*d*). The plurality of tuning cups 47 are Faraday cups configured to measure the beam current of the ion beam incident into the beam stopper 46. The plurality of tuning cups 47 are disposed with intervals in the x-direction. For example, the plurality of tuning cups 47 are used for easily measuring the beam currents at the implantation positions without using the profiler cup 44.

The side cups 42 (42L and 42R), the profiler cup 44, and the tuning cups 47 (47*a* to 47*d*) are beam measurement devices for measuring the beam current as a physical quantity of the ion beam, or beam detection units (beam detectors) for detecting the beam current. The side cups 42 (42L and 42R), the profiler cup 44, and the tuning cups 47 (47*a* to 47*d*) may be beam measurement devices for measuring a beam angle as a physical quantity of the ion beam, or beam detection units for detecting the beam angle.

The ion implanter 10 further includes a control device 60. The control device 60 controls an overall operation of the ion implanter 10. The control device 60 is realized in hardware by elements such as a CPU and a memory of a computer or a mechanical device, and is realized in software by a computer program or the like. Various functions provided by the control device 60 can be realized by cooperation between the hardware and the software.

Figure 3:
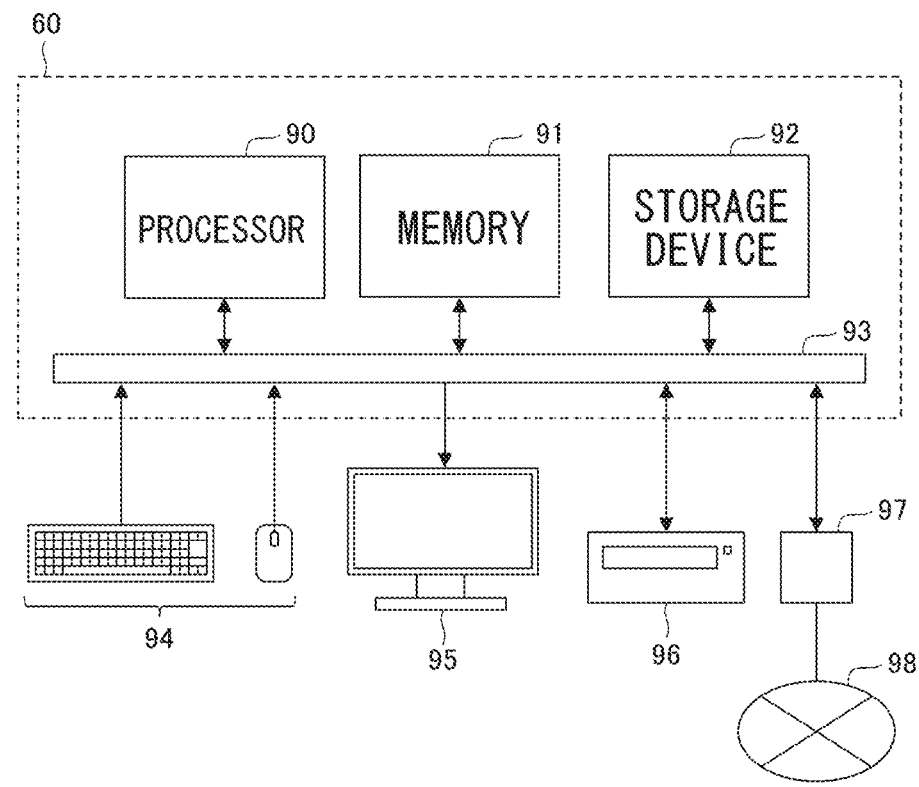
FIG. 3 is a diagram schematically illustrating an example of a configuration of a control device.

FIG. 3 is a diagram schematically illustrating an example of a configuration of the control device 60. The control device 60 includes a processor 90 such as a central processing unit (CPU), a memory 91 such as a read only memory (ROM) and a random access memory (RAM), a storage device 92 such as a hard disk drive (HDD) and a solid state drive (SSD), and a system bus 93 for connecting these. For example, the control device 60 is connected via the system bus 93 to an input device 94 which is a user interface such as a keyboard and a mouse, a display device 95 such as a liquid crystal display, a reading device 96 for reading a program recorded on a storage medium such as a magnetic tape, a magnetic disk, and an optical disk, and a communication interface 97 for acquiring a program by communication via a network 98.

For example, the control device 60 controls an overall operation of the ion implanter 10 in accordance with the program by causing the processor 90 to execute the program stored in the memory 91. The processor 90 may execute the program stored in the storage device 92, may execute the program acquired by the reading device 96 from the storage medium, or may execute the program acquired by the communication interface 97 via the network 98. The memory 91 storing the program may be a volatile memory such as a dynamic random access memory (DRAM) or a non-volatile memory such as an electrically erasable programmable read-only memory (EEPROM), a flash memory, a magnetic resistance memory, a resistance change type memory, and a ferroelectric memory. The non-volatile memory, a magnetic storage medium such as the magnetic tape and the magnetic disk, and an optical storage medium such as the optical disk are examples of a non-transitory and tangible computer-readable storage medium).

Figure 4:
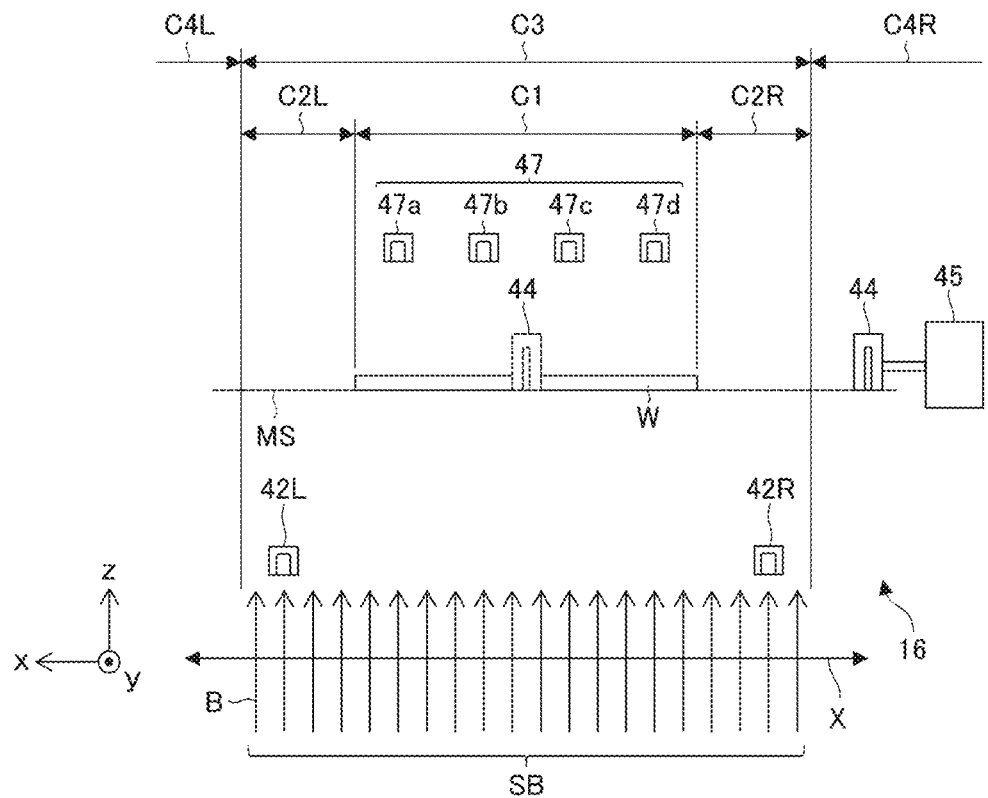
FIG. 4 is a top view schematically illustrating a configuration inside an implantation processing chamber.

FIG. 4 is a top view schematically illustrating a configuration inside the implantation processing chamber 16, and illustrates a state where beam measurement devices disposed inside the implantation processing chamber 16 measure a scan beam SB. An ion beam B is used for a reciprocating scan in the x-direction as indicated by the arrow X, and is incident into the wafer W as the scan beam SB.

The ion beam B is used for the reciprocating scan over a scan range C3 including an implantation range C1 where the wafer W is located and monitor ranges C2L and C2R outside the implantation range C1. The left and right side cups 42L and 42R are respectively disposed in the left and right monitor ranges C2L and C2R. The left and right side cups 42L and 42R can measure the ion beam B used for overscanning performed on the monitor ranges C2L and C2R during the implantation process.

The profiler cup 44 retreats to a non-scan range C4R outside the scan range C3 during the implantation process. In the illustrated configuration, the profiler driving device 45 is disposed on the right side. During the implantation process, the profiler cup 44 retreats to the non-scan range C4R on the right side. In a configuration in which the profiler driving device 45 is disposed on the left side, during the implantation process, the profiler cup 44 may retreat to a non-scan range C4L on the left side.

The profiler cup 44 is disposed in the implantation range C1 during a preparation process performed prior to the implantation process, and measures the beam current of the ion beam B in the implantation range C1. The profiler cup 44 measures the beam current while moving in the x-direction in the implantation range C1, and measures a beam current density distribution of the scan beam SB in the x-direction. The profiler cup 44 measures the beam current at a position of the wafer processing surface by moving in the x-direction along a plane (measurement surface MS) coincident with the wafer processing surface in the implantation process. The profiler cup 44 may measure the beam current density distribution of the scan beam SB in the x-direction in the monitor ranges C2L and C2R, in addition to the implantation range C1.

The plurality of tuning cups 47 are disposed in the implantation range C1, and measure the beam current of the ion beam B in the implantation range C1. The plurality of tuning cups 47 are disposed at positions separated to the downstream side away from the wafer W. The tuning cups 47 do not need to be moved between the implantation range C1 and the non-scan range C4R unlike the profiler cup 44. Therefore, compared to the profiler cup 44, the beam current in the implantation range C1 can be more easily measured by the tuning cups 47.

In the preparation process, beam current measurement values are measured by various Faraday cups provided inside the implantation processing chamber 16. Specifically, a plurality of the beam current measurement values are measured by using the side cups 42L and 42R, the profiler cup 44, and the plurality of tuning cups 47. The control device 60 stores a ratio between the acquired beam current measurement values so that the beam current value on the wafer processing surface can be calculated from the beam current measurement values measured by the side cups 42L and 42R during the implantation process. Normally, the ratio between the beam current measurement values measured by various Faraday cups depends on a setting of a beam optical system in the beamline unit 14. Even when the beam current of the ion beam B extracted from the ion generation device 12 slightly fluctuates, the ratio between the beam current measurement values is substantially constant. That is, when the setting of the beam optical system is determined during the preparation process, the ratio between the beam current measurement values during the subsequent implantation process is not changed. Therefore, when the ratio between the beam current measurement values is stored during the preparation process, based on the ratio and the beam current measurement values measured by the side cups 42L and 42R, it is possible to calculate the beam current value at the implantation position (that is, the wafer processing surface) where the ions are implanted into the wafer W during the implantation process.

During the implantation process, the beam current can be measured at all times by using the side cups 42L and 42R. During the implantation process, the beam current cannot be measured at all times and can be only intermittently measured, by using the profiler cup 44 or the tuning cup 47. Therefore, during the implantation process, a dose of the ions implanted into the wafer processing surface is controlled, based on the beam current measurement values measured by the side cups 42L and 42R. When the beam current measurement values measured by the side cups 42L and 42R are changed during the implantation process, a dose distribution on the wafer processing surface is adjusted by changing a wafer scan speed vw(y) of the wafer W in the y-direction. For example, when an in-plane uniform dose distribution needs to be realized on a plane of the wafer processing surface, the wafer W is caused to reciprocate at a speed proportional to the beam current measurement value monitored by the side cups 42L and 42R. Specifically, when the beam current measurement value to be monitored increases, the wafer scan speed vw(y) becomes faster, and when the beam current measurement value to be monitored decreases, the wafer scan speed vw(y) becomes slower. In this manner, it is possible to prevent the dose distribution on the wafer processing surface from varying due to fluctuations in the beam current of the scan beam SB.

Figure 5:
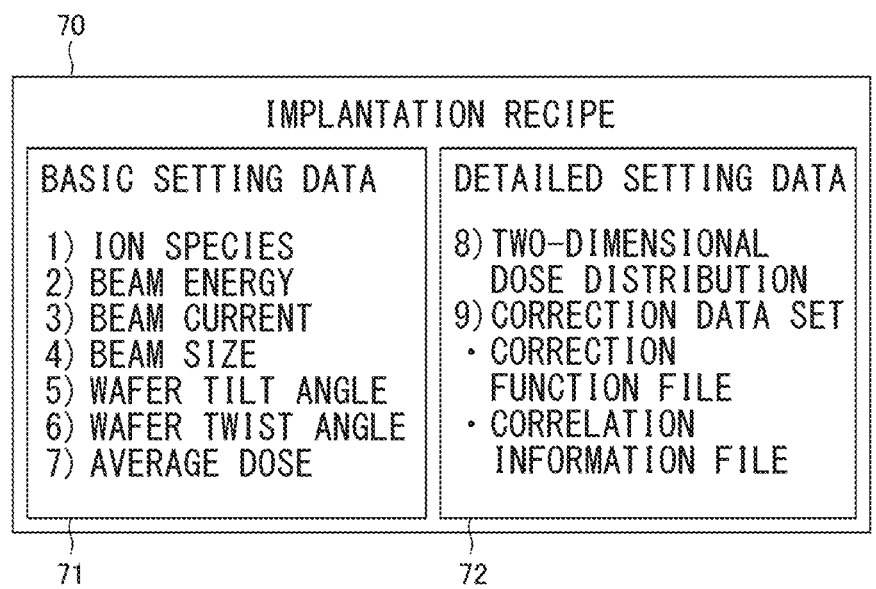
FIG. 5 is a diagram schematically illustrating a data structure of an implantation recipe.

FIG. 5 is a diagram schematically illustrating a data structure of an implantation recipe 70. The control device 60 controls the ion implantation process in accordance with the implantation recipe. The implantation recipe 70 includes basic setting data 71 and detailed setting data 72. The basic setting data 71 determines an implantation condition indicating essential settings. For example, the basic setting 71 includes setting data of 1) an ion species, 2) beam energy, 3) a beam current, 4) a beam size, 5) a wafer tilt angle, 6) a wafer twist angle, and 7) an average dose. The average dose indicates an in-plane average value of a dose distribution to be implanted into the wafer processing surface.

The detailed setting data 72 is set when "nonuniform implantation" is performed to intentionally provide nonuniformity for the dose distribution of the ions to be implanted into the wafer processing surface. The detailed setting data 72 may not be set when "uniform implantation" is performed to provide a uniform pattern for the two-dimensional dose distribution on the wafer processing surface. The detailed setting data 72 includes 8) the two-dimensional dose distribution and 9) a correction data set. For example, the two-dimensional dose distribution is an actual pattern of the two-dimensional nonuniform dose distribution realized on the wafer processing surface WS when the nonuniform implantation is performed. The correction data set is used for performing variable control on the beam scan speed in the x-direction by the beam scan unit 32 and the wafer scan speed in the y-direction by the platen driving device 50. The correction data set includes a correction function file and a correlation information file for realizing the two-dimensional nonuniform dose distribution.

Figure 6A:
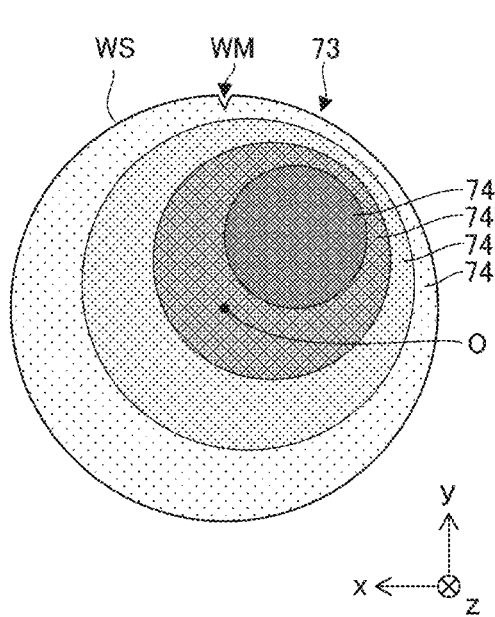
FIGS. 6A and 6B are diagrams schematically illustrating a two-dimensional dose distribution.
Figure 6B:
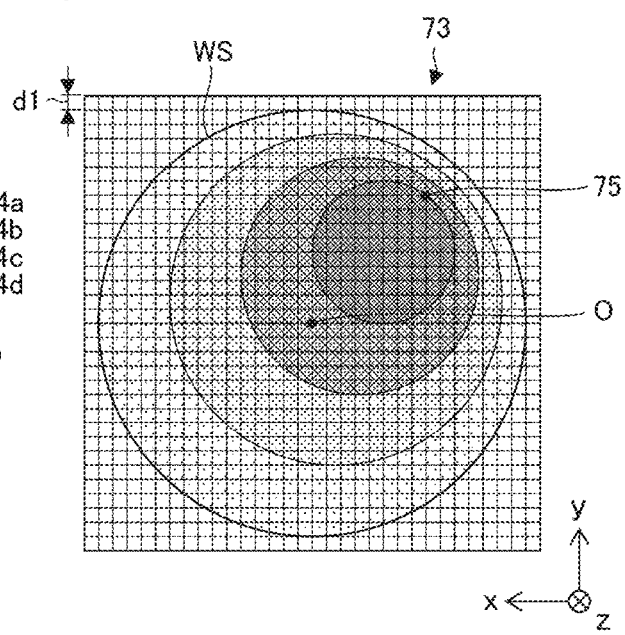

FIGS. 6A and 6B are diagrams schematically illustrating a two-dimensional nonuniform dose distribution 73. FIG. 6A illustrates the two-dimensional dose distribution that is set to be nonuniform on the circular wafer processing surface WS, and illustrates a magnitude of the dose by using the contrasting density of regions 74a, 74b, 74c, and 74d on the wafer processing surface WS. In the illustrated example, the dose in the first region 74a is the largest, and the dose in the fourth region 74d is the smallest. The two-dimensional nonuniform dose distribution 73 is determined, based on an orientation of the wafer W held by the platen driving device 50. Specifically, the two-dimensional nonuniform dose distribution 73 is determined, based on the beam scan direction (x-direction) and a wafer scan direction (y-direction) when the wafer W is disposed on the platen driving device 50 so as to indicate the wafer twist angle determined in the basic setting data 71. In the illustrated example, a direction from a center O of the wafer W toward an alignment mark WM is set as the +y-direction. However, a position of the alignment mark WM may vary depending on the wafer twist angle.

FIG. 6B schematically illustrates a plurality of lattice points 75 for defining the two-dimensional nonuniform dose distribution 73. For example, the plurality of lattice points 75 are set with equal intervals on the wafer processing surface WS. For example, the two-dimensional nonuniform dose distribution 73 is defined by data that associates each position coordinate at the plurality of lattice points 75 with each of dose amounts at the plurality of lattice points 75. For example, in a case of a wafer having a diameter of 300 mm, the lattice points 75 of 31x31 in which the center O of the wafer processing surface WS is an origin is set, and an interval d1 between two of the lattice points 75 adjacent to each other is 10 mm. The interval d1 between the two of the plurality of lattice points 75 adjacent to each other is set so as to be smaller than a beam size of the ion beam B. An example of the beam size of the ion beam B is approximately 20 mm to 30 mm.

Figures 7, 8:
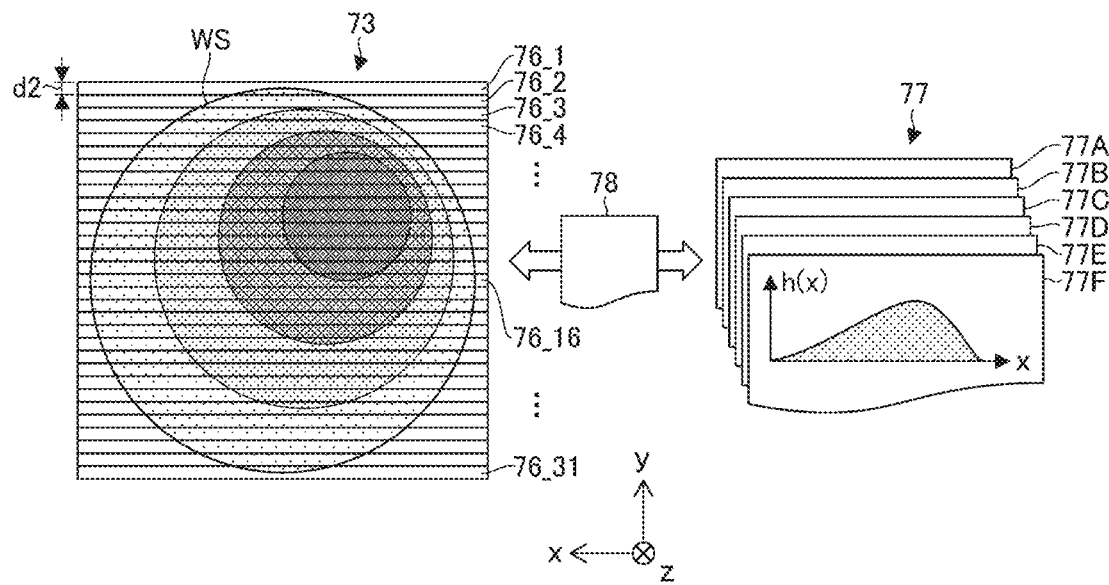
FIG. 7 is a diagram illustrating an example of a correction function file and a correlation information file.
FIG. 8 is a table illustrating an example of the correlation information file.

FIG. 7 is a diagram illustrating an example of correction function files 77 and a correlation information file 78. Each of the correction function files 77 defines a correction function h(x) determined based on the one-dimensional nonuniform dose distribution in the x-direction. A plurality of the correction function files 77 are defined for one of the two-dimensional nonuniform dose distributions 73, and six correction function files 77A, 77B, 77C, 77D, 77E, and 77F are determined in the illustrated example. In the plurality of correction function files 77A to 77F, the correction function h(x) have mutually different shapes, respectively. For example, the number of the plurality of correction function files 77A to 77F which are defined for one of the two-dimensional nonuniform dose distributions 73 is as much as approximately 5 to 10.

The correlation information file 78 defines correlation information that associates the two-dimensional nonuniform dose distribution 73 with the plurality of correction function files 77. The wafer processing surface WS is divided into a plurality of division regions 76_1 to 76_31 (generically referred to as division regions 76) in the y-direction. Any one of the plurality of correction function files 77A to 77F is associated with any one of the plurality of division regions 76. Each division width d2 of the plurality of division regions 76 in the y-direction is the same as the interval d1 of the lattice points 75, and is 10 mm, for example. Each center position of the plurality of division regions 76 in the y-direction can correspond to each position of the lattice points 75. The division width d2 of the plurality of division regions 76 in the y-direction is set to be smaller than the beam size (for example, 20 mm to 30 mm) of the ion beam.

The number of the plurality of correction function files 77 may be smaller than the number of the plurality of division regions 76. Therefore, at least one of the correction function files 77 may be associated with two or more of the plurality of division regions 76. In other words, the correction function h(x) determined in one of correction function files 77 may be commonly used for two or more of the plurality of division regions 76. The correction function h(x) may be normalized so as to be usable in two or more of the plurality of division regions 76. For example, the correction function h(x) may be normalized such that a maximum value, an average value, or an integral value in the x-direction of the correction function h(x) becomes a predetermined value. As correction coefficients k, the correlation information file 78 stores ratios between respective one-dimensional nonuniform dose distributions D(x) in the plurality of division regions 76 and the respective correction functions h(x) corresponding to D(x). Each of one-dimensional nonuniform dose distributions D(x) in the plurality of division regions 76 corresponds to k·h(x) obtained by multiplying the correction function h(x) by the correction coefficient k. A value of the correction coefficient k tends to become larger in one of the division regions 76 having a relatively high dose, and tends to become smaller in another of the division regions 76 having a relatively low dose. The correction coefficients k are used to control the wafer scan speed in the y-direction.

FIG. 8 is a table illustrating an example of the correlation information file 78. The correlation information file 78 determines ranges in the x-direction and the y-direction where the wafer processing surface WS exists, symbols A to F that identify the correction function files 77, and values of the correction coefficients k, for each of region numbers "1" to "31" that identifies each of the plurality of division regions 76. The wafer processing surface WS has a disc shape. Accordingly, as the implant position becomes away from the center O of the wafer processing surface WS in the y-direction, the range in the x-direction where the wafer processing surface WS exists decreases. For example, in the region number "1", the wafer processing surface WS exists only in a range of ±20 mm in the x-direction with respect to the center O of the wafer processing surface WS, and the wafer processing surface WS does not exist outside the range. On the other hand, in the region number "16" corresponding to the center O of the wafer processing surface WS in the y-direction, the wafer processing surface WS exists in an entire range of ±150 mm in the x-direction which corresponds to the diameter of the wafer processing surface WS. In the illustrated example, each width of the plurality of division regions 76 in the y-direction is a constant value (that is 10 mm). However, the respective widths of the plurality of division regions 76 in the y-direction may be different from each other.

Figure 9:
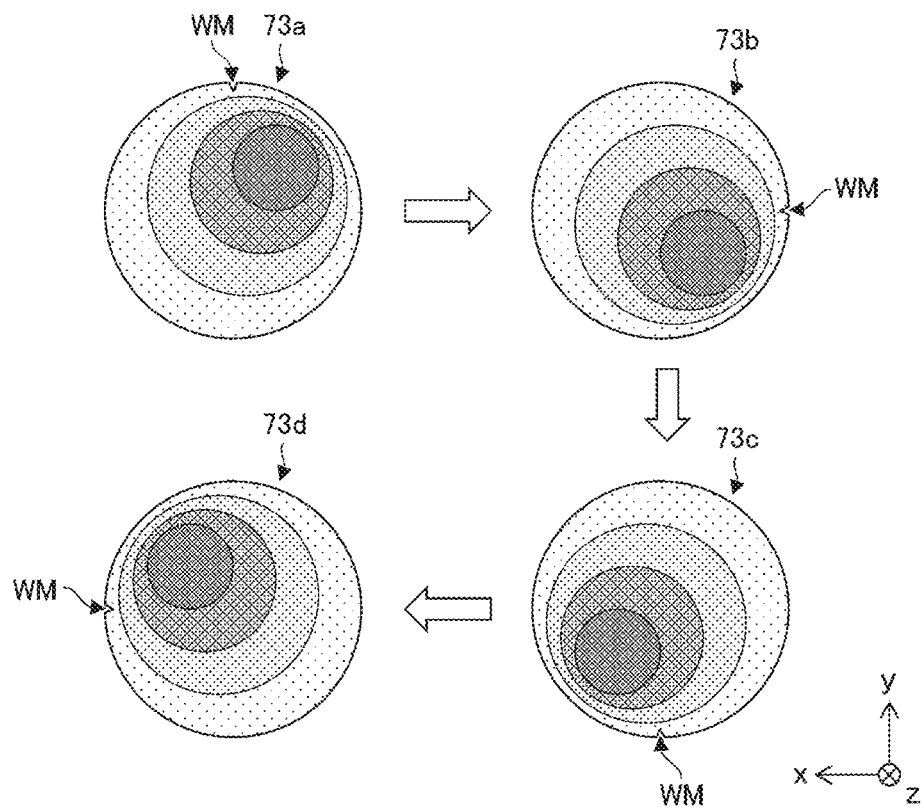
FIG. 9 is a diagram schematically illustrating multiple step implantation.

FIG. 9 is a diagram schematically illustrating a multiple step implantation. When the nonuniform implantation is realized, the "multiple step implantation" may be performed to practice the ion implantations multiple times with changing the wafer twist angle while fixing the two-dimensional nonuniform dose distribution based on the alignment mark WM of the wafer W as a reference. When the wafer twist angle is changed, the two-dimensional nonuniform dose distribution based on a coordinate system of the ion implanter 10 is rotated together. FIG. 9 illustrates a case where the ion implantations are performed four times with rotating the wafer twist angle as much as 90 degrees between the respective ion implantations. A first two-dimensional nonuniform dose distribution 73a is the same as the two-dimensional nonuniform dose distribution 73 illustrated in FIG. 6A described above. A second two-dimensional nonuniform dose distribution 73b is obtained by rotating the first two-dimensional nonuniform dose distribution 73a clockwise as much as 90 degrees. Similarly, a third two-dimensional nonuniform dose distribution 73c is obtained by rotating the second two-dimensional nonuniform dose distribution 73b clockwise as much as 90 degrees, and a fourth two-dimensional nonuniform dose distribution 73d is obtained by rotating the third two-dimensional nonuniform dose distribution 73c clockwise as much as 90 degrees. Each of the plurality of two-dimensional nonuniform dose distributions 73a to 73d in the multiple step implantation has a different shape when viewed from the coordinate system of the ion implanter 10 in the x-direction and the y-direction. Therefore, in the multiple step implantation, an individual correction data set is determined for each of the plurality of two-dimensional nonuniform dose distributions 73a to 73d. When the quadrupole step implantation is performed, the implantation recipe 70 includes four detailed setting data 72 corresponding to the four implantation processes.

Figure 10:
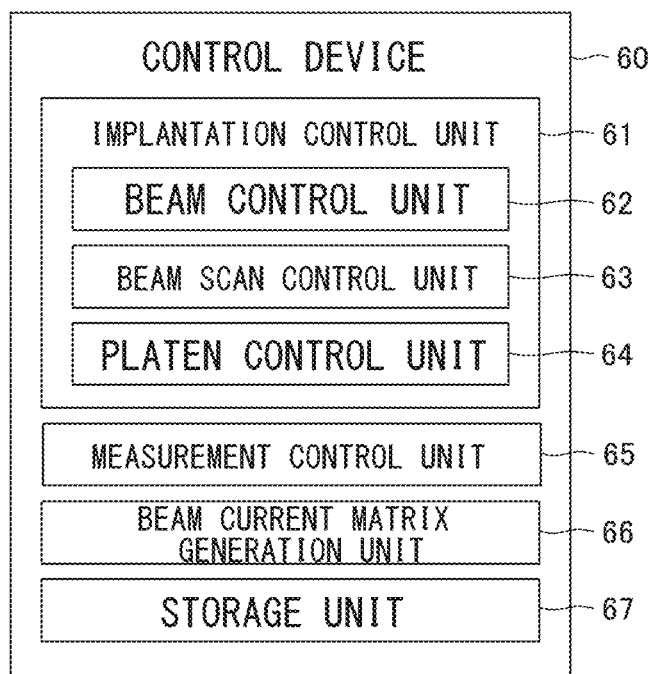
FIG. 10 is a block diagram schematically illustrating a functional configuration of the control device.

FIG. 10 is a block diagram schematically illustrating a functional configuration of the control device 60. The control device 60 includes an implantation control unit 61, a measurement control unit 65, a beam current matrix generation unit 66, and a storage unit 67. Each functional block illustrated in FIG. 10 schematically illustrates various functions provided by the control device 60, and illustrates functions realized by causing the processor 90 of the control device 60 to execute a program stored in the memory 91. A boundary surrounding each functional block is determined in any desired way for convenience of description, and another boundary different from that of the above-described functional block may be determined as long as various functions are appropriately realized. Various functions provided by the control device 60 may be realized by a single device including the processor 90 and the memory 91, or may be realized by the cooperation of a plurality of devices respectively including the processor 90 and the memory 91.

The implantation control unit 61 controls an operation of the ion implanter 10, based on an implantation recipe. The implantation control unit 61 includes a beam control unit 62, a beam scan control unit 63, and a platen control unit 64. The measurement control unit 65 controls an operation of the beam measurement device for measuring the beam current, and acquires measurement values measured by the beam measurement device. The beam current matrix generation unit 66 generates a beam current matrix, based on a scan signal and the measurement values measured by the beam measurement device. The storage unit 67 stores the implantation recipe, operation parameters for realizing the implantation recipe.

The beam control unit 62 adjusts the operation parameters of various devices constituting the ion implanter 10 to realize implantation parameters determined in a desired implantation recipe. The beam control unit 62 controls the ion species of the ion beam by adjusting a gas type and an extraction voltage of the ion generation device 12, the magnetic field intensity of the mass analyzing unit 20, and the like. The beam control unit 62 controls the beam energy of the ion beam by adjusting the extraction voltage of the ion generation device 12, an application voltage of the beam parallelizing unit 34, an application voltage of an AD column, an application voltage of the angular energy filter 36, and the like. The beam control unit 62 controls the beam current of the ion beam by adjusting various parameters such as a gas amount, an arc current, an arc voltage, and an ion source magnet current of the ion generation device 12, an opening width of the mass resolving aperture 23, and the like. The beam control unit 62 controls a beam size of the ion beam incident into the wafer processing surface WS by adjusting an operation parameter of a focusing/defocusing device included in the beam shaping unit 30 and the like.

The beam scan control unit 63 generates a scan signal that determines a time waveform of a scan command value of the beam scan unit 32, and controls an operation of the beam scan unit 32, based on the scan signal. When the beam scan unit 32 is an electric field type, the scan command value corresponds to a scan voltage V applied to the scan electrode pair of the beam scan unit 32. When the beam scan unit 32 is a magnetic field type, the scan command value corresponds to a magnet current flowing through a magnet device of the beam scan unit 32. In the present embodiment, a case where the beam scan unit 32 is the electric field type will be described. Regarding that the scan command value has the same meaning as the scan voltage V, the scan command value will be also referred to as the scan command value V.

The beam scan control unit 63 controls a beam current density distribution $J(x)$ in the beam scan direction (x-direction) by variably controlling a beam scan speed $vb(x)$ realized by the beam scan unit 32. The beam scan speed vb(x) in the x-direction is substantially proportional to a change rate dV/dt of the scan command value V with respect to time t. For example, the beam scan control unit 63 decreases the time change rate dV/dt of the scan command value V so that the beam scan speed vb(x) becomes slower at a location where the dose is to be relatively high. For example, the beam scan control unit 63 increases the time change rate dV/dt of the scan command value V so that the beam scan speed vb(x) becomes faster at a location where the dose is to be relatively low.

The beam scan control unit 63 generates the scan signal for realizing a target beam current density distribution, based on the beam current matrix generated by the beam current matrix generation unit 66. For example, the beam scan control unit 63 generates the scan signal for realizing a beam current density distribution proportional to the correction function h(x), based on the correction function h(x) determined in the correction function files 77 included in the implantation recipe and the beam current matrix. Details of the beam current matrix will be described later.

The platen control unit 64 generates a speed command value for designating a reciprocating speed of the reciprocating mechanism 54, that is, a wafer scan speed vw(y) in the y-direction, based on the correlation information file 78. The platen control unit 64 determines the speed command value so that the wafer scan speed vw(y) becomes slower at a location where the dose is to be relatively high, and the wafer scan speed vw(y) becomes faster at a location where the dose is to be relatively low. For example, the wafer scan speed vw(y) corresponding to a position in the y-direction is set to be proportional to a reciprocal 1/k of each correction coefficient k of the plurality of division regions 76 determined in the correlation information file 78.

The platen control unit 64 may adjust the wafer scan speed, based on the measurement value of the beam current acquired in the implantation process. For example, the platen control unit 64 may adjust the wafer scan speed so as to reduce influence of fluctuations in the beam current in the implantation process, based on the beam current measurement value measured by the side cups 42L and 42R.

Figure 11:
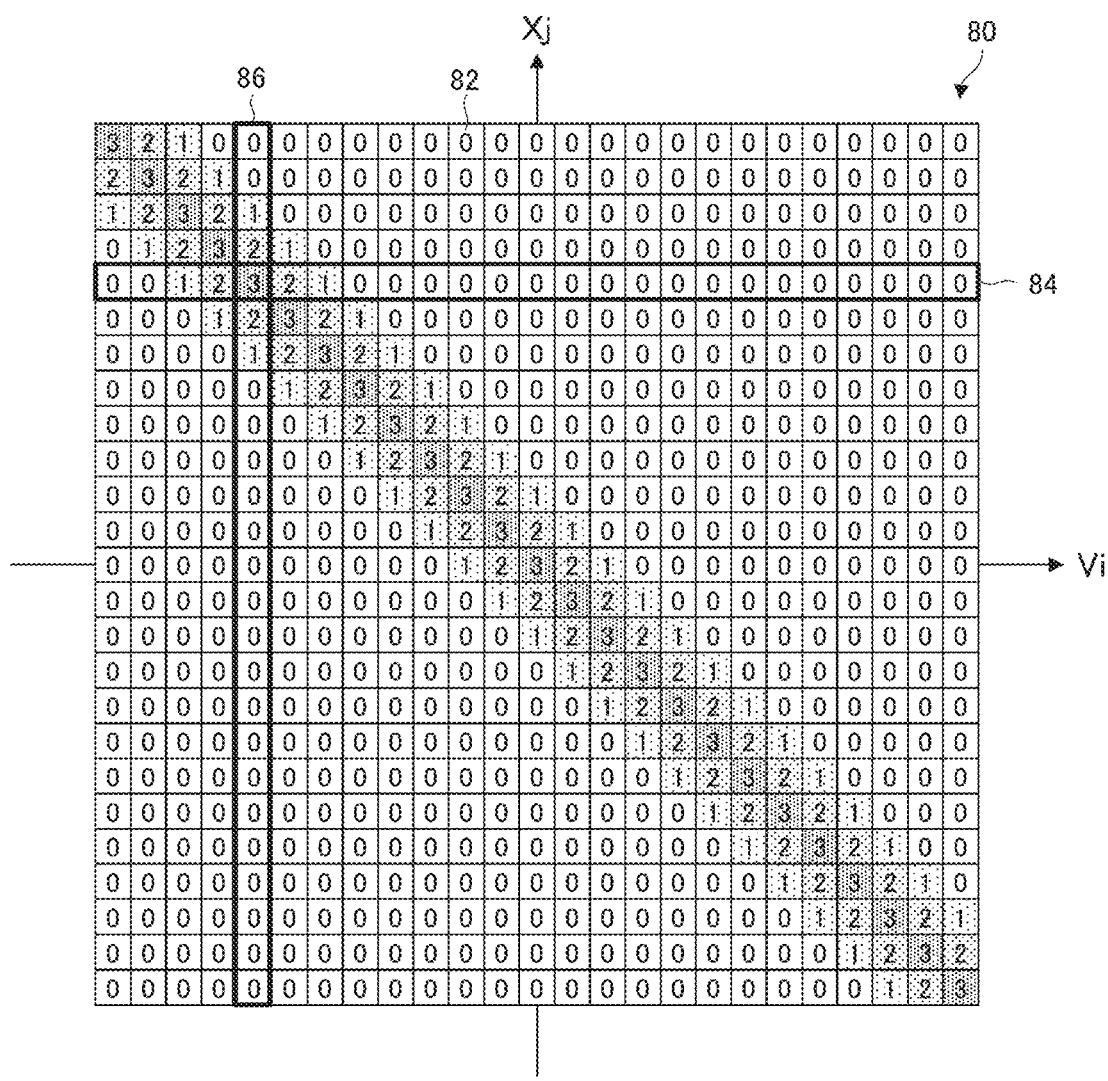
FIG. 11 is a diagram schematically illustrating a beam current matrix according to the embodiment.

FIG. 11 is a diagram schematically illustrating a beam current matrix 80 according to the embodiment. Components 82 of the beam current matrix 80 are beam current values Iij with respect to an array Vi(i=1 . . . m) of the scan command values V of the beam scan unit 32 and an array Xj(j=1 . . . n) of positions X in the x-direction on the measurement surface MS corresponding to the wafer processing surface. In an example in FIG. 11, a row (horizontal direction) of the beam current matrix 80 correspond to the scan command values Vi, and a column (vertical direction) of the beam current matrix 80 correspond to the position Xjs in the x-direction. A row component 84 of the beam current matrix 80 is a beam current distribution I(Vi) with respect to the scan command value Vi when the position Xj in the x-direction is fixed at a specific position. A column component 86 of the beam current matrix 80 is a beam current distribution I(Xj) with respect to the position Xj in the x-direction when the scan command value Vi is fixed at a specific value.

Figure 12:
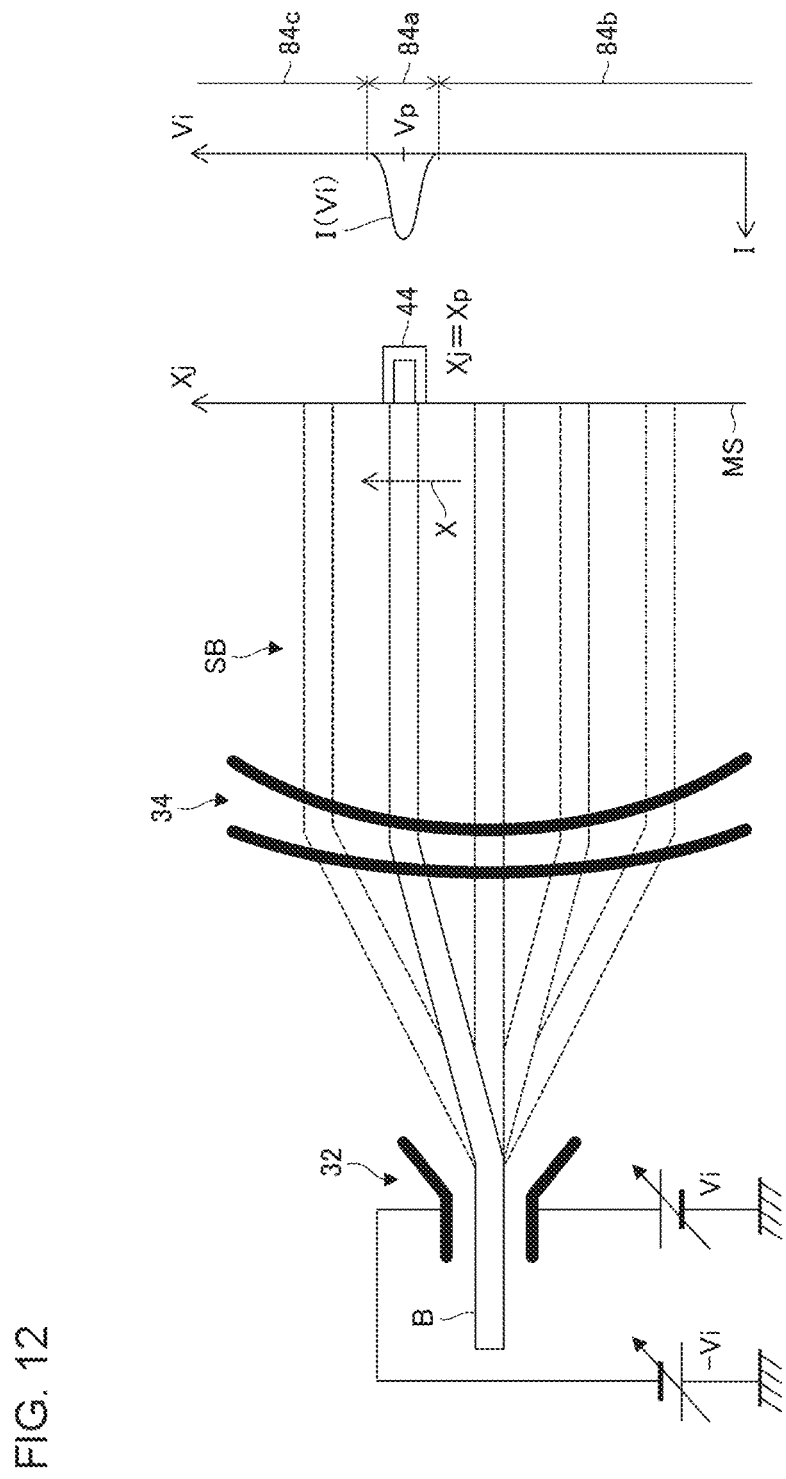
FIG. 12 is a view schematically illustrating measurement of a beam current distribution with respect to scan command values.

FIG. 12 is a view schematically illustrating the measurement of the beam current distribution I(Vi) with respect to the scan command values Vi, and illustrates a method of measuring the row component 84 of the beam current matrix 80 in FIG. 11. The beam current distribution I(Vi) with respect to the scan command value Vi is measured in a state where the scan command value Vi of the beam scan unit 32 is changed so that the ion beam B is scanned as indicated by the arrow X, and is obtained by measuring the beam current of the scan beam SB with the profiler cup 44 fixed at a specific measurement position Xp. For example, the beam current distribution I(Vi) with respect to the scan command value Vi represents a distribution shape having a peak in a range 84a formed around a specific scan command value Vp and showing 0 in ranges 84b and 84c sufficiently separated away from the specific scan command value Vp. Here, the specific scan command value Vp corresponds to the scan command value Vi for deflecting the ion beam B to irradiate the specific measurement position Xp on the measurement surface MS coinciding with the wafer processing surface.

Figure 13:
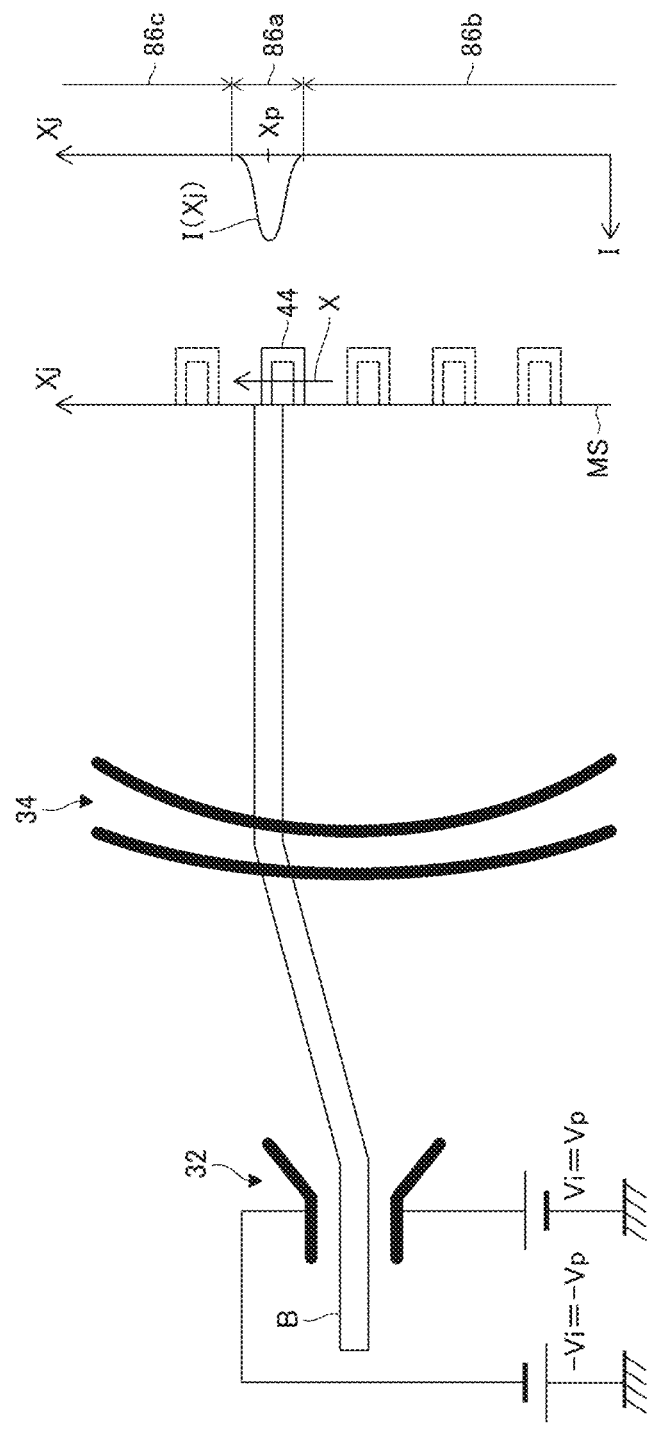
FIG. 13 is a view schematically illustrating measurement of the beam current distribution with respect to positions.

FIG. 13 is a view schematically illustrating the measurement of the beam current distribution I(Xj) with respect to the positions Xj, and illustrates a method of measuring the column component 86 of the beam current matrix 80 in FIG. 11. The beam current distribution I(Xj) with respect to the position Xj is measured in a state where the scan command value Vi of the beam scan unit 32 is fixed at a specific scan command value Vp, and is obtained by measuring the beam current of the ion beam B at a plurality of the measurement positions Xj while moving the profiler cup 44 as indicated by the arrow X. For example, the beam current distribution I(Xj) with respect to the position Xj represents a distribution shape having a peak in a range 86a formed around the specific measurement position Xp and showing 0 in ranges 86b and 86c sufficiently separated away from the specific measurement position Xp. Here, the specific measurement position Xp corresponds to a position Xj in the x-direction which is irradiated with the ion beam B on the measurement surface MS coinciding with the wafer processing surface when the scan command Vi is fixed at the specific scan command value Vp.

Figure 14:
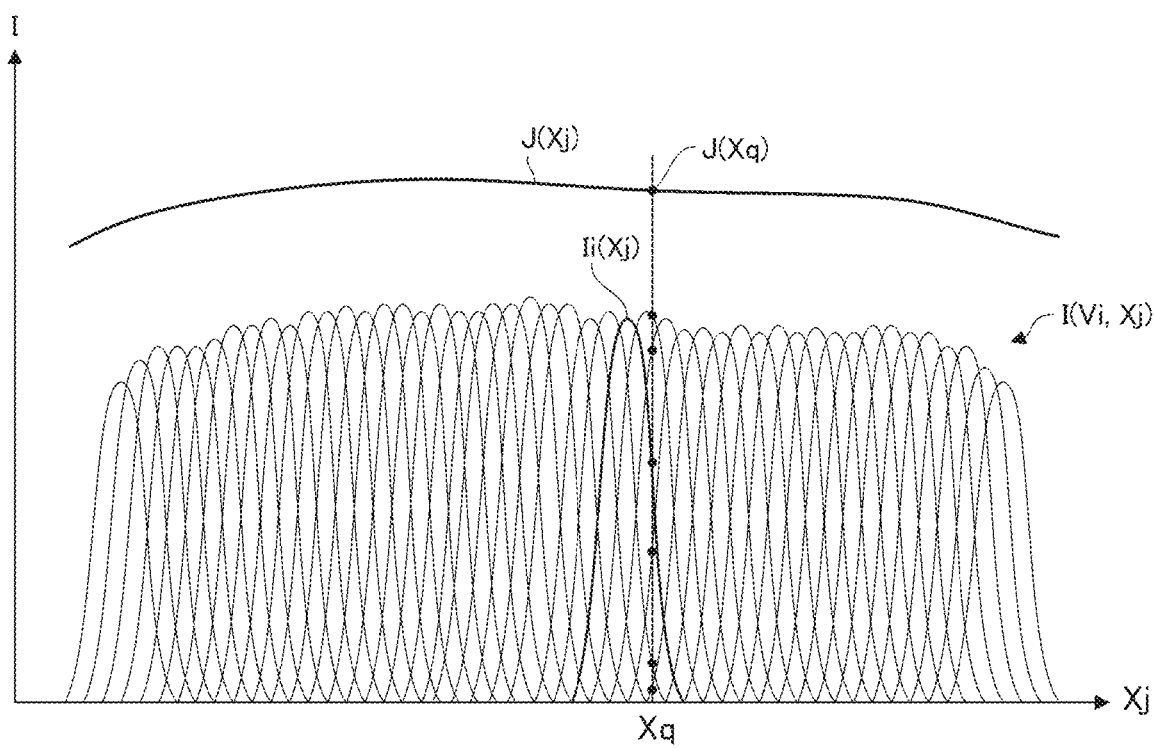
FIG. 14 is a graph schematically illustrating a relationship between the beam current matrix and a beam current density distribution.

FIG. 14 is a graph schematically illustrating a relationship between the beam current matrix I(Vi, Xj) and a beam current density distribution J(Xj). In FIG. 14, a plurality of the beam current distributions Ii(Xj) obtained at different scan command values Vi are illustrated in an overlapping manner. The beam current density distribution J(Xj) corresponds to a sum of the plurality of beam current distributions Ii(Xj) constituting the beam current matrix I(Vi, Xj), and can be expressed by Equation (2) below.

$$J(X_j) = \sum_i I_i(X_j) \cdot \Delta t_i \quad (2)$$

Here, Δti is a staying time of the scan beam at the scan command value Vi, and is proportional to a reciprocal 1/vi of a beam scan speed vi at the scan command value Vi. For example, beam current density J(Xq) at a specific position Xq in the x-direction is a total value of a plurality of beam current values Ii(Xq) at the position Xq of a plurality of beam current distributions Ii(Xj) obtained at different scan command values Vi in view of the staying time Δti, and can be expressed by Equation (3) below.

$$J(X_q) = \sum_i I_i(X_q) \cdot \Delta t_i \quad (3)$$

Next, a method of generating the beam current matrix I(Vi, Xj) will be described. The beam current matrix 80 in FIG. 11 is a set of a plurality of row components 84 or a set of a plurality of column components 86. Accordingly, the beam current matrix 80 can be derived by measuring either the plurality of row components 84 or the plurality of column components 86. In the present embodiment, the beam current matrix 80 is derived by measuring the plurality of row components 84 from a viewpoint of a measurement time. The shortest time needed to measure the row component 84 at the specific measurement position Xp illustrated in FIG. 12 corresponds to half of a reciprocating scan time of the scan beam SB. When a scan period of the scan beam SB is 1 kHz, the shortest time needed to measure the row component 84 at one measurement position Xj is 0.5 ms. On the other hand, the shortest time needed to measure the column component 86 in the specific scan command value Vp illustrated in FIG. 13 corresponds to a time needed to move the profiler cup 44 over the implantation range C1 in FIG. 4, and is approximately 2 seconds, for example.

The measurement control unit 65 acquires the plurality of row components 84 by measuring the beam currents of the scan beam SB at the plurality of measurement positions while moving the profiler cup 44. The scan beam SB serving as a measurement target is subject to reciprocating scan, based on a first scan signal. For example, the first scan signal is configured so that the beam scan speed vb(x) is constant and the time change rate dVi/dt of the scan command value Vi is constant. The first scan signal may be configured so that the beam scan speed vb(x) is not constant and is intentionally nonconstant. A scan beam used for reciprocating scan, based on the first scan signal, is also referred to as a "first scan beam".

For example, the measurement control unit 65 causes the profiler cup 44 to measure the beam current of the scan beam SB at measurement positions which are set at 100 locations with 3 mm intervals in the implantation range C1 of 300 mm. When measuring the beam current while moving the profiler cup 44, for example, the measurement control unit 65 acquires the beam current measured in a range of 3 mm, which reaches to positions of ±1.5 mm from a certain measurement position, as a measurement value of the beam current at the certain measurement position. When a movement speed of the profiler cup 44 is 150 mm/s, a time required for passing through an interval of 3 mm between the measurement positions is 20 ms. When the scan period of the scan beam SB is 1 kHz, the ion beam B is used for the reciprocating scan 20 times in 20 ms. Accordingly, the scan beam SB can be measured 20 times each in forward and backward traveling of the scanning, and can be measured 40 times in total in forward and backward traveling. Therefore, in 2 seconds when the profiler cup 44 is moved over the implantation range C1 of 300 mm, for example, a time waveform of the beam current of the scan beam SB can be measured 40 times at each of the 100 measurement locations, and an average value thereof can be calculated.

Figure 15:
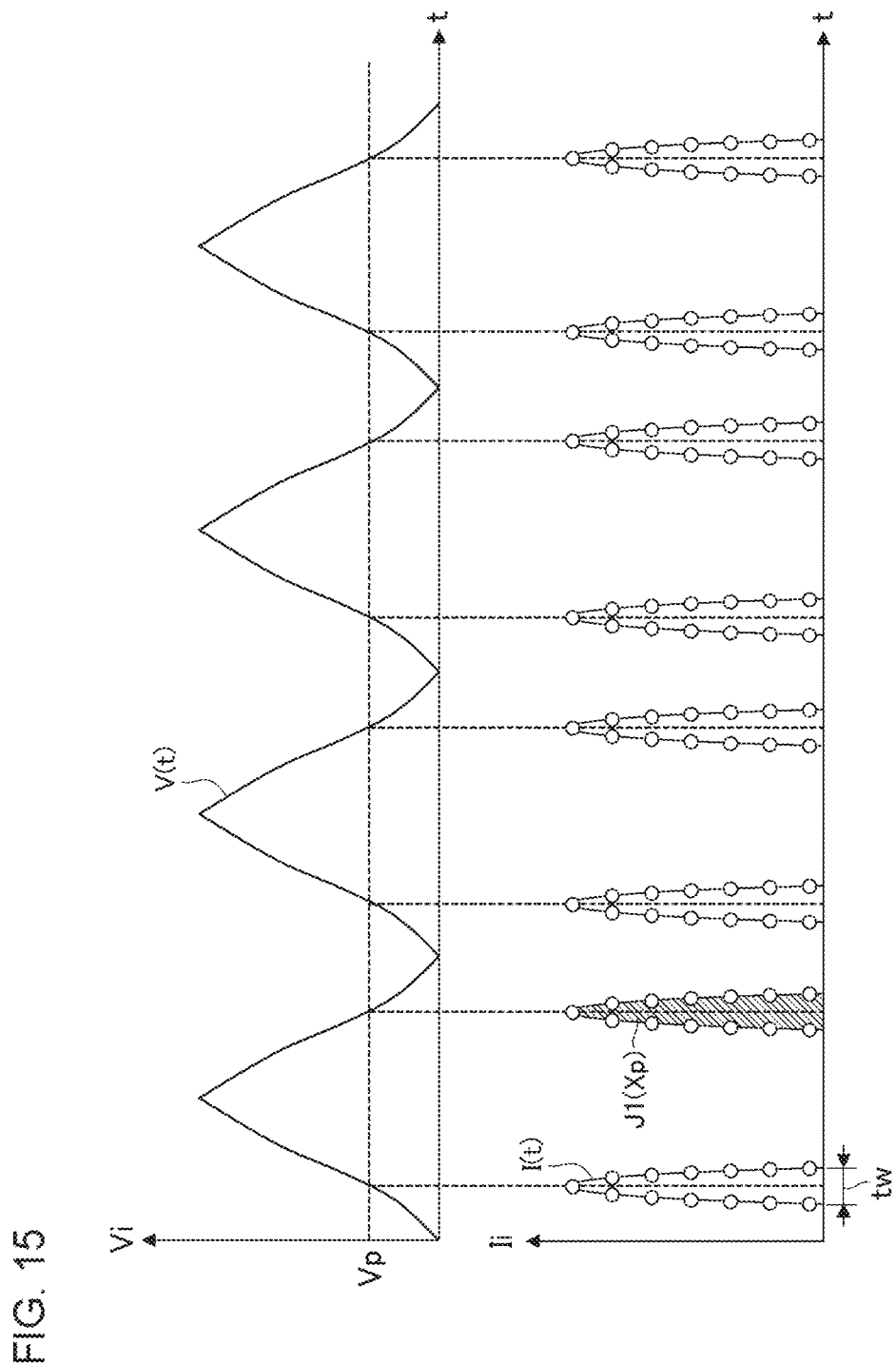
FIG. 15 is a graph illustrating an example of time waveforms of a first scan signal and a beam current.

FIG. 15 is a graph illustrating an example of the time waveforms of the first scan signal and the beam current. An upper part in FIG. 15 illustrates an example of the time waveform of the first scan signal. A lower part in FIG. 15 illustrates the time waveform (also referred to as a scan beam shape) of the beam current measured by the profiler cup 44 when the profiler cup 44 is located at the specific measurement position Xp. The scan beam SB crosses the profiler cup 44 at a timing when the scan command value Vi reaches the specific scan command value Vp corresponding to the measurement position Xp of the profiler cup 44. Accordingly, a scan beam shape I(t) is measured at a timing when the scan command value Vi reaches the specific scan command value Vp. A time width tw of one scan beam shape I(t) corresponds to a time required for the scanning spot-like ion beam B to cross a measurement width (slit width) of the profiler cup 44. For example, when the measurement width of the profiler cup 44 in the x-direction is 5 mm, a spot size of the ion beam B in the x-direction is 15 mm, and a scan speed of the ion beam B in the x-direction is 800 m/s, the time width tw of one scan beam shape is 25 μs. A circle in the lower part in FIG. 15 indicates a sampling timing for the beam current measurement. A sampling frequency of the beam current measurement is 0.5 MHz, for example. In the example in FIG. 15, the scan beam shape having the time width tw of 25 μs is sampled with a time interval of 2 μs. Accordingly, one scan beam shape I(t) is configured to have 13 sampling values.

Various parameters relating to the measurement of the scan beam SB are not limited to numerical values described above as examples, and any other desired numerical value may be adopted. A scan frequency of the scan beam SB is selected from a range of 0.1 Hz to 10 kHz, and is selected from a range of 1 Hz to 5 kHz, for example. The implantation range C1 is selected from a range of 100 mm to 1,000 mm, and is selected from a range of 150 mm to 450 mm, for example. The implantation range C1 is preferably selected from a range of 200 mm to 300 mm. For example, the implantation range C1 may be selected, based on the diameter of the wafer W. The movement speed of the profiler cup 44 is selected from a range of 50 mm/s to 500 mm/s, and is selected from a range of 100 mm/s to 300 mm/s, for example. The interval between the measurement positions is selected from a range of 0.5 mm to 100 mm, and is selected from a range of 1 mm to 10 mm, for example. The spot size of the ion beam B is selected from a range of 5 mm to 500 mm, and is selected from a range of 10 mm to 300 mm, for example. The spot size of the ion beam B is preferably selected from a range of 20 mm to 200 mm. The measurement width of the profiler cup 44 is selected from a range of 1 mm to 30 mm, and is selected from a range of 5 mm to 10 mm, for example. The sampling frequency of the beam current is selected from a range of 10 kHz to 10 MHz, and is selected from a range of 0.1 MHz to 1 MHz, for example.

The measurement control unit 65 may cause the profiler cup 44 to reciprocate over the implantation range C1 so that the measurement positions of the beam current are different between the forward traveling and the backward traveling of the reciprocating movement. For example, the profiler cup 44 may measure the time waveform of the beam current at a plurality of first measurement positions in the forward traveling of the reciprocating movement, and may measure the time waveform of the beam current at a plurality of second measurement positions in the backward traveling of the reciprocating movement. The plurality of first measurement positions and the plurality of second measurement positions may be set to be alternately located in the x-direction.

The measurement control unit 65 may correct the time waveform of the beam current, based on a parameter relating to the beam current measurement of the beam measurement device. The measurement control unit 65 may correct the scan beam shape, based on the measurement width in the x-direction of the beam measurement device. The beam measurement device such as the profiler cup 44 measures an average value of the beam current over the measurement width (slit width) in the x-direction. Therefore, the time width tw of one scan beam shape measured by the profiler cup 44 is larger than the time width of the true scan beam shape corresponding to the actual spot size of the ion beam B. In the example in FIG. 15, the time width tw of the scan beam shape measured by the profiler cup 44 is 25 μs for the ion beam B having the spot size of 15 mm. However, the time width of the true scan beam shape is 19 µs.

For example, the measurement control unit 65 may derive the true scan beam shape by correcting the time waveform of the beam current by using a relationship that the measurement value of the scan beam shape is configured with components each of which is obtained by smoothing a part of the true scan beam shape. The measurement control unit 65 may derive the true scan beam shape by correcting the time waveform of the beam current so as to narrow the time width tw of the measurement value of the scan beam shape.

Figure 16:
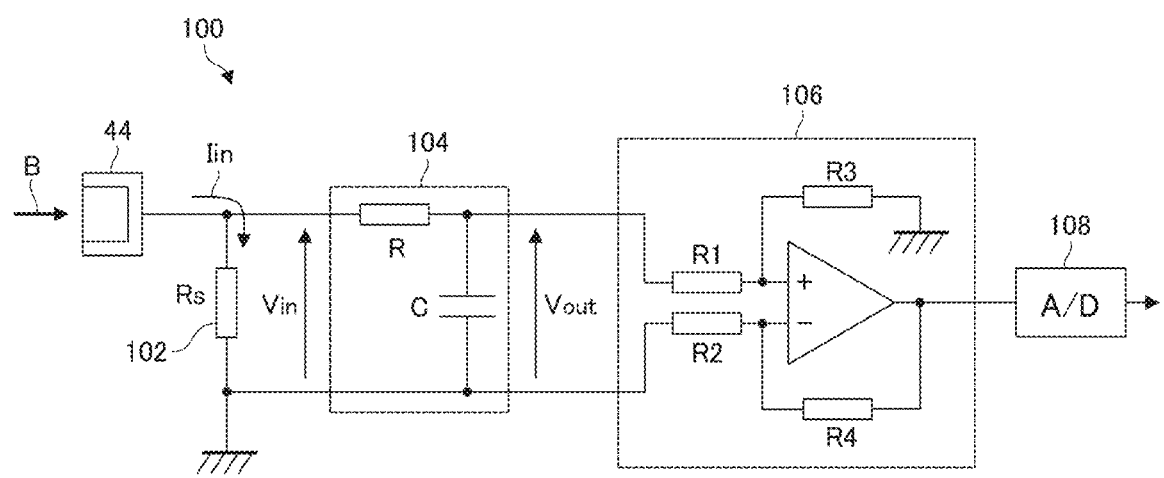
FIG. 16 is a circuit diagram illustrating an example of a configuration of a beam current measurement circuit.

The measurement control unit 65 may correct the time waveform of the beam current, based on a time constant $\tau = CR$ of a low-pass filter included in a beam current measurement circuit. FIG. 16 is a circuit diagram illustrating an example of a configuration of a beam current measurement circuit 100. The beam current measurement circuit 100 includes a shunt resistor 102, a filter circuit 104, an amplifier circuit 106, and an analog to digital (AD) conversion circuit 108. The shunt resistor 102 converts a beam current Iin of the ion beam incident into the profiler cup 44 into an input voltage Vin. When a resistance value of the shunt resistor 102 is Rs, Vin=Rs·Iin. The filter circuit 104 is a low-pass filter (LPF) using a resistor R and a capacitor C, and generates an output voltage Vout which is obtained by smoothing the input voltage Vin. A relationship between the input voltage Vin and the output voltage Vout of the filter circuit 104 is expressed as Vin=Vout+CR (dVout/dt). The amplifier circuit 106 is a voltage amplification circuit configured to include an operational amplifier and resistors R1 to R4, and outputs a voltage ß·Vout which is obtained by amplifying the output voltage Vout of the filter circuit 104 with a predetermined amplification factor ß. The A/D conversion circuit 108 samples the output voltage ß·Vout of the amplifier circuit 106 to generate a digital value. The measurement control unit 65 acquires the digital value output from the A/D conversion circuit 108 as the measurement value of the beam current.

The measurement value of the beam current acquired by the measurement control unit 65 is proportional to the output voltage Vout of the filter circuit 104. Accordingly, the measurement value is not proportional to the true scan beam shape Iin(t) measured by the profiler cup 44. The measurement control unit 65 may derive the true scan beam shape Iin(t) by calculating Vin from Vout, based on a relational expression of Vin=Vout+CR (dVout/dt) by using the time constant $\tau = CR$ of the filter circuit 104.

Furthermore, the measurement control unit 65 calculates the beam current density distribution in the x-direction of the first scan beam by performing time integration on the beam current measured by the beam measurement device at each of the measurement positions Xj. An actual measurement value of the beam current density distribution of the first scan beam is also referred to as a "first beam current density distribution J1 (Xj)". For example, the measurement control unit 65 performs time integration on the scan beam shape illustrated in the lower part in FIG. 15, and calculates an area occupied by the scan beam shape. In this manner, the measurement control unit 65 calculates an actual measurement value J1(Xp) of the first beam current density at the specific measurement position Xp. The measurement control unit 65 acquires the scan beam shape I(t) by sampling and measuring the time waveform of the beam current measured by the profiler cup 44, and simultaneously calculates the actual measurement value of the first beam current density distribution J1 (Xj) by performing time integration on the time waveform of the beam current.

The beam current matrix generation unit 66 calculates a beam current matrix, based on a time waveform I(t) of the beam current at a plurality of measurement positions and a time waveform V(t) of the scan command value determined in the first scan signal. The beam current matrix generation unit 66 converts the time waveform I(t) of the beam current into the beam current distribution I(Vi) with respect to the scan command value Vi, based on the time waveform V(t) of the scan command value, and calculates the beam current distributions I(Vi) at the plurality of measurement positions. In this manner, the beam current matrix generation unit 66 calculates the beam current matrix in which beam current values I(Xj, Vi)=Iij with respect to the plurality of positions Xj and the plurality of scan command values Vi are set as components.

The beam current matrix generation unit 66 may calculate components Iij=I(Xd, Vj) of the beam current values with respect to a plurality of supplementary positions Xd different from a plurality of measurement positions Xc, based on components Iij=I(Xc, Vj) of the beam current values with respect to the plurality of measurement positions Xc. For example, the beam current matrix generation unit 66 may perform interpolation to calculate the component Iij=I(Xd, Vj) of the beam current value with respect to a supplementary position Xd located between two adjacent measurement positions Xc1 and Xc2. The beam current matrix generation unit 66 may perform extrapolation to calculate the component Iij=I(Xd, Vj) of the beam current value with respect to the supplementary position Xd located outside the plurality of measurement positions Xc. The number of the plurality of supplementary positions Xd may be approximately the same as the number of the plurality of measurement positions Xc, or may be larger than the number of the plurality of measurement positions Xc. The number of the plurality of supplementary positions Xd may be approximately 2 to 5 times the number of the plurality of measurement positions Xc.

The beam current matrix generation unit 66 corrects a value of each component Iij of the calculated beam current matrix, based on the actual measurement value of the first beam current density distribution J1 (Xj), and determines a value of each component I'ij of the corrected beam current matrix. The corrected beam current matrix I'ij is obtained by multiplying the beam current matrix Iij before correction by a correction matrix αij, and can be expressed as I'ij=αij·Iij. The correction matrix αij is determined so that a calculation value of the beam current density distribution J'(Xj) calculated based on the corrected beam current matrix I'ij and the actual measurement value of the first beam current density distribution J1 (Xj) coincide with each other. The calculation value of the beam current density distribution J'(Xj) calculated based on the corrected beam current matrix I'ij is expressed by Equation (4) below by using the staying time Δt1i of the first scan beam at the scan command value Vi determined in the first scan signal.

$$J'(X_j) = \sum_i I'_{ij} \cdot \Delta t 1_i \qquad (4)$$

Ideally, it is desirable that the calculation value of the beam current density distribution J(Xj) calculated by Equation (5) below, based on the beam current matrix Iij before correction and the scan command value Vi determined in the first scan signal coincides with the actual measurement value of the first beam current density distribution J1 (Xj). However, according to findings of the inventors, there is a deviation therebetween.

$$J(X_j) = \sum_i I_{ij} \cdot \Delta t 1_i \qquad (5)$$

The calculation value of the beam current density distribution J(Xj) expressed by Equation (5) above is calculated supposing that $\Delta ti = \Delta t1i$ in Equation (1).

Figure 17:
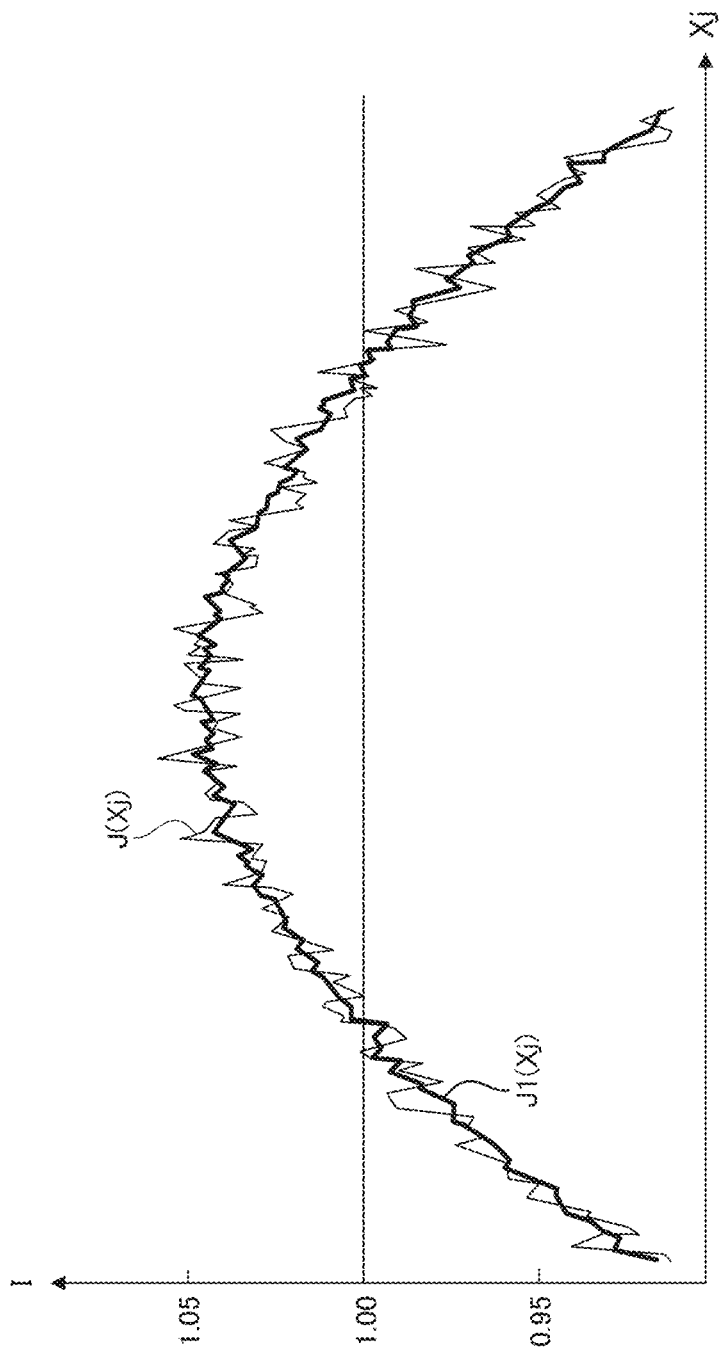
FIG. 17 is a graph illustrating an example of a calculation value of the beam current density distribution based on the beam current matrix before correction and an actual measurement value of the beam current density distribution.

FIG. 17 a graph illustrating an example of the calculation value of the beam current density distribution J(Xj) calculated based on the beam current matrix Iij before correction and the scan command value Vi determined in the first scan signal, and the actual measurement value of the first beam current density distribution J1 (Xj). A vertical axis of the graph illustrates current intensity, and an average value of a whole beam current density distributions is normalized as 1. The calculation value J(Xj) and the actual measurement value J1 (Xj) substantially coincide with each other. However, there exist deviations therebetween within a range of approximately ±2% depending on the positions Xj. In order that the calculation value J(Xj) and the actual measurement value J1 (Xj) coincide with each other, a correction coefficient α(Xj) according to the position Xj can be defined, and can be expressed as α(Xj)=J1 (Xj)/J(Xj). The correction matrix αij is a diagonal matrix having the correction coefficients α(Xj) as diagonal components.

Next, a method of generating a scan signal based on the beam current matrix will be described. The beam scan control unit 63 generates the scan signal, based on a target beam current density distribution Jt(Xj) and the corrected beam current matrix I'ij generated by the beam current matrix generation unit 66. Here, the scan signal for realizing the target beam current density distribution Jt(Xj) is also referred to as a "second scan signal". The beam scan control unit 63 calculates a beam staying time $\Delta t2i$ so as to satisfy a relationship in Equation (6) below.

$$J_t(X_j) = \sum_i I'_{ij} \cdot \Delta t 2_i \qquad (6)$$

The beam scan control unit 63 generates the second scan signal, based on the staying time $\Delta t2i$ of the scan beam at the scan command value Vi.

The beam scan control unit 63 can calculate the staying time $\Delta t2i$ of the scan beam at the scan command value Vi by using an optimization calculation method. For example, the beam staying time $\Delta t2i$ can be calculated by optimization calculation based on a first evaluation value for evaluating a difference between the target beam current density distribution Jt(Xj) and the beam current density distribution J'(Xj) calculated based on the corrected beam current matrix I'ij and the beam staying time $\Delta t2i$. As a first evaluation value E1, for example, a sum of square errors between the target values Jt(Xj) and the calculation values J'(Xj), which is expressed by Equation (7) below, can be used.

$$E1 = \sum_j \{J_t(X_j) - J'(X_j)\}^2 \qquad (7)$$

The beam scan control unit 63 can calculate the beam staying time $\Delta t2i$ by the optimization calculation in which the first evaluation value E1 is minimized.

The beam scan control unit 63 may perform the optimization calculation by combining a plurality of evaluation values. The beam scan control unit 63 may further use a second evaluation value for evaluating a change amount of the time change rate dVi/dt of the scan command value Vi in the second scan signal. For example, the second evaluation value E2 can be defined as a sum of squares of change amounts in the beam staying time $\Delta t2i$, and can be expressed by Equation (8) below.

$$E2 = \sum_i \left\{ \frac{\Delta t2_i - \Delta t2_{i-1}}{\Delta t2_i} \right\}^2 \qquad (8)$$

The optimization calculation is performed so that the second evaluation value E2 becomes smaller. As a result, the change rate of the beam staying time $\Delta t2i$ can be reduced, and a change at the scan command value Vi in the second scan signal can be mitigated. The beam scan control unit 63 can use an evaluation function E in which the first evaluation value E1 and the second evaluation value E2 are combined with each other, and may perform the optimization calculation so that E=E1+w2·E2 is minimized. Here, w2 is a weighting coefficient of the second evaluation value E2 with respect to the first evaluation value E1.

The beam scan control unit 63 may further use a third evaluation value for evaluating the beam current amount used to irradiate a partial range of the scan range C3 of the ion beam B. The third evaluation value E3 can be defined as the sum of squares of the calculation values of the beam current density distribution J'(Xj) for which the positions Xj are located in a specific range (for example, Xa≤Xj≤Xb), and can be expressed by Equation (9) below.

$$E3 = \sum_{a \leq j \leq b} \{J'(X_j)\}^2 \qquad (9)$$

For example, when the implantation range C1 in FIG. 4 is set as the specific range, the optimization calculation may be performed so as to maximize the beam current amount in the implantation range C1 and so as to minimize the beam current amount in the monitor ranges C2L and C2R. In addition, when an X-range in FIG. 8 is set as the specific range, the optimization calculation may be performed so as to maximize the beam current amount in a range where the wafer W exists. When the correction function h(x) that reduces the implantation dose in a partial region of the wafer W is defined, the optimization calculation may be performed so as to minimize the beam current amount in the range where the wafer W exists. In addition, a range where the wafer W does not exist may be set as the specific range, and the beam current amount in the range where the wafer W does not exist may be maximized (or minimized). In this manner, the beam current amount in the range where the wafer W exists may be minimized (or maximized). The beam scan control unit 63 can use an evaluation function E in which the first evaluation value E1 and the third evaluation value E3 are combined with each other, and the optimization calculation may be performed so that E=E1+w3·E3 is minimized. Here, w3 is a weighting coefficient of the third evaluation value E3 with respect to the first evaluation value E1. The beam scan control unit 63 may use an evaluation function E in which three evaluation values E1 to E3 are combined with each other, or may perform the optimization calculation so that E=E1+w2·E2+w3·E3 is minimized.

The beam scan control unit 63 may generate a plurality of second scan signals, based on the corrected beam current matrix I'ij. The plurality of second scan signals are generated to realize the plurality of target beam current density distributions. For example, the plurality of target beam current density distributions correspond to a plurality of correction functions h(x) for performing two-dimensional nonuniform implantation.

The beam scan control unit 63 controls an operation of the beam scan unit 32, based on the generated second scan signal, and generates the second scan beam. The measurement control unit 65 measures the beam current of the second scan beam by using the beam measurement device. For example, the measurement control unit 65 calculates the actual measurement value of the second current density distribution J2 (Xj) of the second scan beam by performing time integration on the measurement value of the beam current measured by the profiler cup 44. The beam scan control unit 63 compares the actual measurement value of the second current density distribution J2 (Xj) with the target beam current density distribution Jt(Xj), and evaluates validity of the second scan signal. For example, when a difference between the actual measurement value J2 (Xj) and the target value Jt(Xj) falls within a predetermined range, it is determined that the second scan signal is valid, and when the difference deviates from the predetermined range, it is determined that the second scan signal is not valid. When it is determined that the second scan signal is valid, the implantation control unit 61 irradiates the wafer W with the second scan beam based on the second scan signal to perform the ion implantation process.

The measurement control unit 65 may measure the beam current of the second scan beam by using another beam measurement device different from the profiler cup 44, instead of measuring the beam current of the second scan beam by the profiler cup 44. The measurement control unit 65 may measure the second current density distribution J2 (Xj) of the second scan beam by using another beam measurement device different from the beam measurement device used for measuring the first scan beam. The measurement control unit 65 may measure the second current density distribution J2 (Xj) of the second scan beam by using the plurality of tuning cups 47a to 47d. When the plurality of tuning cups 47a to 47d are used, it is not necessary to move the profiler cup 44 in the x-direction. Therefore, the second current density distribution J2 (Xj) can be more quickly and easily measured compared to a case of using the profiler cup 44. The beam scan control unit 63 may evaluate the validity of the second scan signal, based on the actual measurement value of the second current density distribution J2 (Xj) measured by the plurality of tuning cups 47a to 47d.

When it is determined that the second scan signal is not valid, the beam scan control unit 63 may regenerate the second scan signal for realizing the target beam current density distribution Jt(Xj). The beam scan control unit 63 may regenerate the second scan signal by changing the target value, instead of using the target beam current density distribution Jt(Xj) as the target value without any change. For example, a value Ju(Xj)=Jt(Xj)+m·ΔJ(Xj) obtained by adding a difference value ΔJ(Xj)=Jt(Xj)−J2 (Xj) between the target value Jt(Xj) and the actual measurement value of the second current density distribution J2 (Xj) of the second scan beam to the initial target value may be set as a new target value. The second scan signal may be regenerated by using the new target value Ju(Xj). Here, m has a positive value, and is a coefficient for adjusting weighting of the difference value ΔJ(Xj).

When it is determined that the second scan signal generated or regenerated by the beam scan control unit 63 is not valid, the beam current matrix generation unit 66 may regenerate the corrected beam current matrix I'ij. For example, when beam conditions such as the beam current and the beam size of the ion beam B are changed, the measurement control unit 65 may remeasure the first scan beam based on the first scan signal, and the beam current matrix generation unit 66 may regenerate the corrected beam current matrix I'ij, based on a re-measurement result.

The beam control unit 62 may estimate a beam shape of the spot-like ion beam B in the x-direction, based on the corrected beam current matrix I'ij, and may adjust the beam shape of the ion beam B, based on the estimated beam shape. The column component 86 of the beam current matrix 80 illustrated in FIG. 11 is the beam current distribution I(Xj) with respect to the position Xj in the x-direction when the scan command value Vi is fixed at the specific value. Therefore, the column component 86 represents the beam shape of the ion beam B in the x-direction without scanning. For example, the column component I'0 (Xj) of the corrected beam current matrix at the scan command value Vi=0 may be regarded as the beam shape of the ion beam B. The beam control unit 62 may adjust the beam size, based on the column component I'0 (Xj).

According to the present embodiment, the second scan signal for realizing the target beam current density distribution Jt(Xj) is generated, based on the corrected beam current matrix I'ij. In this manner, compared to the related art, the valid second scan signal can be highly accurately generated in a short time. According to the method in the related art, in some cases, the valid second scan signal cannot be generated with a single calculation process. In some cases, the valid second scan signal cannot be generated unless the calculation process is performed multiple times while repeating the actual measurement of the beam current density distribution. In addition, when the shape of the target beam current density distribution Jt(Xj) is complicated, according to the method in the related art, the valid second scan signal cannot be generated even if the calculation process is performed multiple times while repeating the actual measurement of the beam current density distribution. Consequently, the generation may fail. On the other hand, according to the present embodiment, even in a case where the method in the related art fails, the valid second scan signal can be generated by performing less number of the calculation processes such as once or twice. As a result, a working time required for generating the second scan signal in a preparation process before the implantation process can be shortened, and productivity in the ion implantation process can be improved. In particular, when the plurality of second scan signals need to be generated for the nonuniform implantation, the working time required in the preparation process can be significantly shortened.

Subsequently, an ion implantation method of using the above-described ion implanter 10 will be described. Here, an ion implantation process included in a method for manufacturing a semiconductor device in which an irradiation target of the ion beam B is a semiconductor wafer W will be described.

Figure 18:
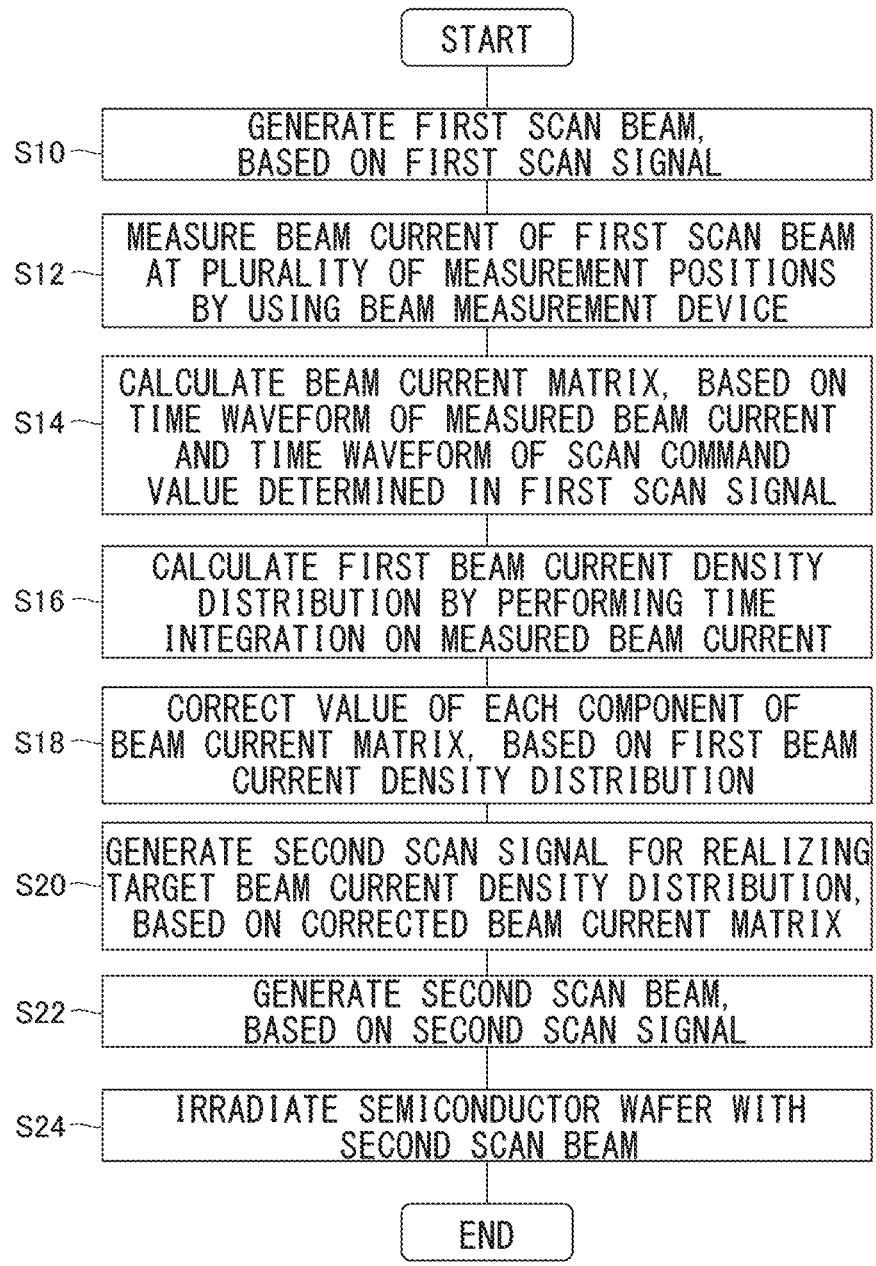
FIG. 18 is a flowchart illustrating an example of an ion implantation method according to an embodiment.

FIG. 18 is a flowchart illustrating an example of an ion implantation method according to an embodiment. The beam scan control unit 63 operates the beam scan unit 32, based on the first scan signal, and causes the beam scan unit 32 to perform reciprocating scan using the spot-like ion beam B in the predetermined direction (x-direction). In this manner, the beam scan control unit 63 generates the first scan beam (S10). The measurement control unit 65 measures the beam current of the first scan beam at the plurality of measurement positions different in the predetermined direction (x-direction) by using a beam measurement device (S12). The beam current matrix generation unit 66 calculates the beam current matrix in which the beam current values with respect to the plurality of positions different in the predetermined direction (x-direction) and the plurality of scan command values are set as components, based on the time waveform of the beam current measured by the beam measurement device and the time waveform of the scan command values determined in the first scan signal (S14). The measurement control unit 65 calculates the first beam current density distribution in the predetermined direction (x-direction) of the first scan beam by performing time integration on the measured beam current (S16). The beam current matrix generation unit 66 corrects a value of each component of the beam current matrix, based on the first beam current density distribution, and generates the corrected beam current matrix (S18). The beam scan control unit 63 generates the second scan signal for realizing the target beam current density distribution, based on the corrected beam current matrix (S20). The beam scan control unit 63 operates the beam scan unit 32, based on the second scan signal, and causes the beam scan unit 32 to perform reciprocating scan using the spot-like ion beam B in the predetermined direction (x-direction). In this manner, the beam scan control unit 63 generates the second scan beam (S22). The implantation control unit 61 performs the ion implantation process by irradiating the semiconductor wafer with the second scan beam (S24).

Hitherto, the present disclosure has been described with reference to each of the above-described embodiments. However, the present disclosure is not limited to each of the above-described embodiments. The configuration of each of the embodiments may appropriately be combined or replaced with each other. In addition, the combination or the process order in each embodiment can be appropriately rearranged, based on the knowledge of those skilled in the art, and modifications such as various design changes can be added to the embodiments. The embodiments to which the rearrangement or the modifications are added in this way may also be included in the scope of the ion implanter, the ion implantation method, and a method for manufacturing a semiconductor device according to the present disclosure.

The embodiments according to the present disclosure may adopt a form of a computer program including one or more computer-readable sequences for describing the methods according to the present disclosure, or may adopt a form of a non-temporary and tangible storage medium (for example, a non-volatile memory, a magnetic tape, a magnetic disk, or an optical disk) in which the computer program is stored. The processor may realize the method according to the present disclosure by executing the computer program.

It should be understood that the disclosure is not limited to the above-described embodiment, but may be modified into various forms on the basis of the spirit of the disclosure. Additionally, the modifications are included in the scope of the disclosure.

What is claimed is:

1. An ion implantation method comprising:
   generating a first scan beam by performing a reciprocating scan using a spot-like ion beam in a predetermined direction, based on a first scan signal;
   measuring a beam current of the first scan beam by using a beam measurement device at a plurality of measurement positions different in the predetermined direction;
   calculating a beam current matrix in which beam current values with respect to a plurality of positions different in the predetermined direction and a plurality of scan command values are set as components, based on a time waveform of the beam current measured by the beam measurement device and a time waveform of the scan command values determined in the first scan signal;
   calculating a first beam current density distribution of the first scan beam in the predetermined direction by performing time integration on the measured beam current;
   correcting a value of each component of the beam current matrix, based on the first beam current density distribution; and
   generating a second scan signal for realizing a target beam current density distribution in the predetermined direction, based on the corrected beam current matrix,
   wherein the second scan signal is generated by performing an optimization calculation so that an evaluation function in which a first evaluation value and a second evaluation value are combined is minimized,
   wherein the first evaluation value evaluates a difference between a beam current density distribution calculated based on the corrected beam current matrix and a candidate second scan signal, and the target beam current density distribution, and
   wherein the second evaluation value evaluates variations in time change rates of scan command values in the candidate second scan signal.

2. The ion implantation method according to claim 1, further comprising:
   correcting the time waveform of the beam current, based on a parameter relating to beam current measurement of the beam measurement device,
   wherein the beam current matrix is calculated, based on the corrected time waveform of the beam current.

3. The ion implantation method according to claim 2, wherein the time waveform of the beam current is corrected, based on a measurement width of the beam measurement device in the predetermined direction.

4. The ion implantation method according to claim 2, wherein the time waveform of the beam current is corrected, based on a time constant of a beam current measurement circuit of the beam measurement device.

5. The ion implantation method according to claim 1, wherein the beam current is measured at the plurality of measurement positions by moving the beam measurement device in the predetermined direction.

6. The ion implantation method according to claim 5, further comprising:
   causing the beam measurement device to perform reciprocating movement in the predetermined direction,
   wherein the plurality of measurement positions include a plurality of first measurement positions and a plurality of second measurement positions, and
   the beam current is measured at the plurality of first measurement positions when the beam measurement device moves in a forward traveling direction of the reciprocating movement, and is measured at the plurality of second measurement positions when the beam measurement device move in a backward traveling direction of the reciprocating movement.

7. The ion implantation method according to claim 1, wherein the beam measurement device includes a plurality of faraday cups disposed at positions different in the predetermined direction.

8. The ion implantation method according to claim 1, wherein calculating the beam current matrix includes calculating components of beam current values with respect to a plurality of supplementary positions different from the plurality of measurement positions, based on components of the beam current values with respect to the plurality of measurement positions.

9. The ion implantation method according to claim 1, wherein calculating the beam current matrix includes converting the time waveform of the beam current into a waveform of the beam current with respect to the scan command values, based on the time waveform of the scan command values determined in the first scan signal.

10. The ion implantation method according to claim 1, wherein in the first scan signal, time change rates of the scan command values are nonuniform.

11. The ion implantation method according to claim 1, wherein the second scan signal is generated, further based on a third evaluation value for evaluating a beam current amount used to irradiate a part of a scan range of the ion beam in the predetermined direction.

12. The ion implantation method according to claim 1, further comprising:
generating a second scan beam by performing the reciprocating scan using the ion beam in the predetermined direction, based on the second scan signal; and
irradiating a workpiece with the second scan beam.

13. The ion implantation method according to claim 12, wherein generating the second scan signal includes generating a plurality of regional scan signals for realizing corresponding regional target beam current density distributions, based on the corrected beam current matrix,
generating the second scan beam includes sequentially generating a plurality of the regional scan beams corresponding to the plurality of regional scan signals, and
irradiating the workpiece with the second scan beam includes irradiating each of a plurality of regions divided in a direction perpendicular to the predetermined direction on the workpiece with any one of the plurality of regional scan beams.

14. The ion implantation method according to claim 12, further comprising:
calculating a second beam current density distribution by measuring the second scan beam; and
comparing the calculated second beam current density distribution with the target beam current density distribution.

15. The ion implantation method according to claim 14, wherein the calculated second beam current density distribution is measured by using another beam measurement device separated from the beam measurement device used in measuring the first scan beam.

16. The ion implantation method according to claim 14, wherein the second scan signal is generated again, based on the calculated second beam current density distribution, the target beam current density distribution, and the corrected beam current matrix.

17. The ion implantation method according to claim 1, further comprising:
estimating a beam shape of the ion beam, based on the corrected beam current matrix; and
adjusting the beam shape of the ion beam, based on the estimated beam shape.

18. An ion implanter comprising:
a beam scan unit that generates a first scan beam by performing a reciprocating scan using a spot-like ion beam in a predetermined direction, based on a first scan signal;
a beam measurement device configured to measure a beam current of the first scan beam at a plurality of measurement positions different in the predetermined direction; and
a control device that generates a scan signal for determining a time waveform of a plurality of scan command values with respect to scan positions in the predetermined direction, based on a measurement obtained by the beam measurement device,
wherein the control device is configured to
acquire a time waveform of the beam current of the first scan beam measured at the plurality of measurement positions,
calculate a beam current matrix in which beam current values with respect to a plurality of positions different in the predetermined direction and the plurality of scan command values are set as components, based on the acquired time waveform of the beam current and the time waveform of the scan command values determined in the first scan signal,
calculate a first beam current density distribution of the first scan beam in the predetermined direction by performing time integration on the measured beam current,
correct a value of each component of the beam current matrix, based on the first beam current density distribution, and
generate a second scan signal for realizing a target beam current density distribution in the predetermined direction, based on the corrected beam current matrix,
wherein the second scan signal is generated by performing an optimization calculation so that an evaluation function in which a first evaluation value and a second evaluation value are combined is minimized,
wherein the first evaluation value evaluates a difference between a beam current density distribution calculated based on the corrected beam current matrix and a candidate second scan signal, and the target beam current density distribution, and
wherein the second evaluation value evaluates variations in time change rates of scan command values in the candidate second scan signal.

19. The ion implanter according to claim 18, wherein the control device is configured to convert the time waveform of the beam current into a waveform of the beam current with respect to the scan command values, based on the time waveform of the scan command values determined in the first scan signal.

20. The ion implanter according to claim 18, wherein the beam scan unit generates a second scan beam by performing the reciprocating scan using the ion beam in the predetermined direction, based on the second scan signal, and
the ion implanter irradiates a workpiece with the second scan beam.

21. The ion implanter according to claim 20,
wherein the control device is configured to generate a plurality of regional scan signals for realizing corresponding regional target beam current density distributions, based on the corrected beam current matrix,
the beam scan unit sequentially generates a plurality of regional scan beams corresponding to the plurality of regional scan signals by performing the reciprocating scan using the ion beam in the predetermined direction, based on respective of the plurality of second scan signals, and
the ion implanter irradiates each of a plurality of regions divided in a direction perpendicular to the predetermined direction on the workpiece with any one of the plurality of regional scan beams.

22. A method for manufacturing a semiconductor device, comprising:
an ion implantation process,
wherein the ion implantation process includes
generating a first scan beam by performing a reciprocating scan using a spot-like ion beam in a predetermined direction, based on a first scan signal,
measuring a beam current of the first scan beam at a plurality of measurement positions different in the predetermined direction,
calculating a beam current matrix in which beam current values with respect to a plurality of positions different in the predetermined direction and a plurality of scan command values are set as components, based on a time waveform of the measured beam current and a time waveform of the scan command values determined in the first scan signal,
calculating a first beam current density distribution of the first scan beam in the predetermined direction by performing time integration on the measured beam current,
correcting a value of each component of the beam current matrix, based on the first beam current density distribution,
generating a second scan signal for realizing a target beam current density distribution in the predetermined direction, based on the corrected beam current matrix,
generating a second scan beam by performing the reciprocating scan using the ion beam in the predetermined direction, based on the second scan signal, and
irradiating a workpiece with the second scan beam,
wherein the second scan signal is generated by performing an optimization calculation so that an evaluation function in which a first evaluation value and a second evaluation value are combined is minimized,
wherein the first evaluation value evaluates a difference between a beam current density distribution calculated based on the corrected beam current matrix and a candidate second scan signal, and the target beam current density distribution, and
wherein the second evaluation value evaluates variations in time change rates of scan command values in the candidate second scan signal.

23. The method for manufacturing a semiconductor device according to claim 22,
wherein calculating the beam current matrix includes converting the time waveform of the beam current into a waveform of the beam current with respect to the scan command values, based on the time waveform of the scan command values determined in the first scan signal.

24. The method for manufacturing a semiconductor device according to claim 22,
wherein generating the second scan signal includes generating a plurality of regional scan signals for realizing corresponding regional target beam current density distributions, based on the corrected beam current matrix,
generating the second scan beam includes sequentially generating a plurality of regional scan beams corresponding to the plurality of regional scan signals, and
irradiating the workpiece with the second scan beam includes irradiating each of a plurality of regions divided in a direction perpendicular to the predetermined direction on the workpiece with any one of the plurality of regional scan beams.

* * * * *